US 12,422,225 B2

(12) United States Patent
Teetzel et al.

(10) Patent No.: US 12,422,225 B2
(45) Date of Patent: Sep. 23, 2025

(54) BATTERY PACK ADAPTER ASSEMBLY FOR POWERED WEAPON ACCESSORY RAIL INTERFACE

(71) Applicant: WILCOX INDUSTRIES CORP., Newington, NH (US)

(72) Inventors: James W. Teetzel, Portsmouth, NH (US); Elliott S. Turner, Newmarket, NH (US)

(73) Assignee: Wilcox Industries Corp., Newington, NH (US)

( * ) Notice: Subject to any disclaimer, the term of this patent is extended or adjusted under 35 U.S.C. 154(b) by 0 days.

(21) Appl. No.: 18/438,485

(22) Filed: Feb. 11, 2024

(65) Prior Publication Data

US 2024/0274954 A1     Aug. 15, 2024

Related U.S. Application Data

(60) Provisional application No. 63/445,739, filed on Feb. 15, 2023.

(51) Int. Cl.
    *F41G 11/00*            (2006.01)
    *F41C 27/00*            (2006.01)
    (Continued)

(52) U.S. Cl.
    CPC .............. *F41G 11/00* (2013.01); *F41C 27/00* (2013.01); *H01M 50/244* (2021.01); *H01M 50/247* (2021.01); *H01M 50/264* (2021.01); *H01M 50/289* (2021.01); *H02J 7/0025* (2020.01); *H02J 7/0045* (2013.01);
    (Continued)

(58) Field of Classification Search
CPC ..... H01M 50/247; F41C 27/00; F41C 11/003; H02J 7/0025; F41G 11/00
See application file for complete search history.

(56) References Cited

U.S. PATENT DOCUMENTS 3,280,742 A * 10/1966 Babb .......................... F42D 1/22
                                                               181/116
3,939,771 A * 2/1976 McReynolds ............. F42D 1/22
                                                               403/361
(Continued)

FOREIGN PATENT DOCUMENTS

CA            3128661 A1 * 5/2022 .............. F41A 17/06
CN         119163925 A * 12/2024
(Continued)

OTHER PUBLICATIONS

European search report dated Jul. 9, 2024, received in European patent application No. EP24156495.4 filed Feb. 8, 2024.

*Primary Examiner* — Benjamin P Lee
(74) *Attorney, Agent, or Firm* — McLane Middleton, Professional Association

(57) ABSTRACT

A battery pack adapter and method for mounting battery pack to a weapon are provided. The battery pack adapter is detachable coupled to a powered rail system of a weapon such as a rifle or other firearm, the battery pack adapter for powering one or more weapon accessory devices on the powered rail system. In preferred embodiments, the battery pack adapter and method herein are advantageously configured for use with battery packs that comply with a Small Tactical Universal Battery (STUB) form factor.

20 Claims, 25 Drawing Sheets

(51) Int. Cl.
*H01M 50/244* (2021.01)
*H01M 50/247* (2021.01)
*H01M 50/264* (2021.01)
*H01M 50/289* (2021.01)
*H02J 7/00* (2006.01)
*H02J 7/34* (2006.01)
*H02J 7/36* (2006.01)

(52) U.S. Cl.
CPC ............ *H02J 7/0063* (2013.01); *H02J 7/345* (2013.01); *H02J 7/36* (2013.01); *H01M 2220/30* (2013.01)

(56) References Cited

U.S. PATENT DOCUMENTS

| | | | |
|---|---|---|---|
| 6,901,865 B1 * | 6/2005 | Thomson | F42D 1/22 |
| | | | 102/319 |
| 8,091,265 B1 | 1/2012 | Teetzel et al. | |
| 10,557,687 B2 | 2/2020 | Teetzel et al. | |
| 10,876,814 B1 * | 12/2020 | Visser | F41C 23/22 |
| 10,969,202 B2 | 4/2021 | Teetzel et al. | |
| 11,828,556 B2 * | 11/2023 | Paspaliaris | F41A 21/30 |
| 2010/0218410 A1 * | 9/2010 | Cabahug | F41C 23/16 |
| | | | 42/71.01 |
| 2010/0275489 A1 * | 11/2010 | Cabahug | F41C 23/04 |
| | | | 42/71.01 |
| 2011/0010979 A1 * | 1/2011 | Houde-Walter | F41G 11/003 |
| | | | 42/84 |
| 2011/0173865 A1 * | 7/2011 | Compton | F41C 27/00 |
| | | | 42/84 |
| 2013/0104438 A1 | 5/2013 | Hines | |
| 2014/0047754 A1 * | 2/2014 | Compton | F41G 11/00 |
| | | | 42/84 |
| 2015/0020427 A1 * | 1/2015 | Compton | H04B 5/266 |
| | | | 42/71.01 |
| 2017/0205202 A1 * | 7/2017 | Teetzel | F41G 11/003 |
| 2022/0099410 A1 * | 3/2022 | Hashemi | F41G 11/003 |
| 2022/0341697 A1 * | 10/2022 | Cabahug | F41A 35/00 |
| 2023/0142324 A1 * | 5/2023 | Campbell | F41G 11/003 |
| | | | 42/113 |
| 2025/0085080 A1 * | 3/2025 | Teetzel | F41G 11/003 |

FOREIGN PATENT DOCUMENTS

| | | | | |
|---|---|---|---|---|
| EP | | 4417931 A1 * | 8/2024 | ............. F41C 23/22 |
| WO | WO-2022225754 A2 * | | 10/2022 | ............. F41A 35/00 |

* cited by examiner

BATTERY PACK ADAPTER ASSEMBLY FOR POWERED WEAPON ACCESSORY RAIL INTERFACE

CROSS REFERENCE TO RELATED APPLICATION

This application claims the priority benefit of U.S. provisional application No. 63/445,739 filed Feb. 15, 2023. The aforementioned application is incorporated herein by reference in its entirety.

BACKGROUND

The present disclosure relates generally to weapon mounted accessory devices and, in particular, to battery pack adapters and methods for mounting battery packs to a weapon, such as a rifle or other firearm, and methods of using same.

Advancements in weapons combat technologies has resulted in numerous specialized weapon accessory devices, such as laser sights, infrared and visible spectrum light sources, night vision and other optoelectronic devices, visible and thermal spectrum cameras, range finders, ballistic computers, fire control systems, among others. As the number of accessory devices has increased, so too has the power requirements for such systems. As such, an improved battery mounting system for powering such weapon accessory devices is contemplated.

SUMMARY

A battery pack adapter and method for mounting a battery pack to a weapon are provided. The battery pack adapter is detachably coupled to a powered rail system of a weapon, such as a rifle or other firearm, the battery pack adapter for coupling a power supply powering one or more weapon accessory devices on the powered rail system. In preferred embodiments, the battery pack adapter and method herein are advantageously configured for use with battery packs that comply with a Small Tactical Universal Battery (STUB) form factor.

In one aspect, a battery adapter comprises a housing having a first side and a second side transversely spaced apart from the first side. A first axially extending side wall is disposed on the first side and a second axially extending side wall is disposed on the second side. An axially extending channel is disposed intermediate the first and second side walls, the axially extending channel having a cross-sectional profile configured to physically and electrically mate with a portion of a weapon accessory mounting rail. A first battery pack interface member is hingedly coupled to the first side and a second battery pack interface member is hingedly coupled to the housing side. The first battery pack interface member is configured to physically and electrically mate with a first external battery pack and the second battery pack interface member is configured to physically and electrically mate with a second external battery pack. Each of the first battery pack interface member and the second battery pack interface member is pivotal between a deployed position configured for normal operation of the first external battery pack and the second external battery pack, respectively, and an accessible position configured for attachment and detachment of the first external battery pack and the second external battery pack, respectively.

The battery adaptor of claim 1, further comprising electronic circuitry disposed within the housing electrically coupled to a first electrical connector disposed on the first battery pack interface member and a second electrical connector disposed on the second battery pack interface member, the first and second electrical connectors configured for electrical coupling to the first and second external battery packs, respectively.

In a more limited aspect, the battery adaptor further includes a third electrical connector disposed within the axially extending channel, wherein the electronic circuitry comprises power switching circuitry for coupling the third electrical connector to a selected one of the first electrical connector and the second electrical connector.

In another more limited aspect, the battery adaptor further includes a first manual actuator disposed on the first battery pack interface member for coupling the third electrical connector to the first electrical connector and a second manual actuator disposed on the second battery pack interface member for coupling the third electrical connector to the second electrical connector.

In another more limited aspect, the power switching circuitry is configured to automatically switch from one of the first and second external battery packs to the other one of the first and second external battery packs when a charge state of the one of the first and second external battery packs falls below a preselected threshold.

In another more limited aspect, the electronic circuitry comprises one or more capacitors configured to storing electrical energy and configured to act as one or both of a temporary power supply for preventing power interruption when the third electrical connector is switched from the first electrical connector to the second electrical connector or vice versa, and a temporary power supply for preventing power interruption when one or both of the first and second external battery packs are removed and/or replaced with a another like external battery pack.

In another more limited aspect, each of the first and second battery pack interface members comprises a plurality of electrical conductors extending between the plurality of electrical contacts and respective first and second electrical contact and the third electrical contact and a hollow pivot pin pivotally coupling the respective first and second battery pack interface members to the respective first and second side of the housing, wherein the hollow pivot pin defines a passageway for the plurality of electrical conductors.

In another more limited aspect, the hollow pivot pin includes an axial bore open at a distal end of the hollow pivot pin and a transverse aperture in communication with the axial bore disposed along a shaft of the hollow pivot pin.

In another more limited aspect, a distal end of the first external battery pack configured to pivot away from an axial centerline of the housing when the first battery pack interface member is pivoted from the deployed position to the accessible position when the first external battery pack is attached to the first battery pack interface member and a distal end of the second external battery pack is configured to pivot away from the axial centerline of the housing when the second battery pack interface member is pivoted from the deployed position to the accessible position when the second external battery pack is attached to the second battery pack interface member.

In another more limited aspect, each of the first and second battery pack interface members has an align-and-twist connector for detachably coupling the first and second external battery packs, respectively.

In another more limited aspect, the first and second battery pack interface members are configured to attach to first and second external battery packs having a Small Tactical Universal Battery (STUB) form factor.

In another more limited aspect, the first and second external battery packs mutually obstruct each other to prevent detachment when the first and second external battery packs are attached to the respective first and second battery pack interface members and the first and second external battery packs are in the deployed position.

In another more limited aspect, the battery adaptor further includes a spring element biasing the first and second first battery pack interface members to the accessible position.

In another more limited aspect, the battery adaptor further includes a first latch member configured to releasably engage a complementary catch member disposed on the first battery pack interface member to secure the first battery pack interface member in the deployed position. A second latch member is configured to engage a complementary catch member disposed on the second battery pack interface member to secure the second battery pack interface member in the deployed position.

In another more limited aspect, the battery adaptor further includes a locking plate configured to engage a distal end of the first external battery pack and a distal end of the second external battery pack and secure the first and second external battery packs in the respective deployed position.

In another more limited aspect, the battery adaptor further includes a tether cord securing the locking plate to the housing.

In another more limited aspect, the battery adaptor further includes one or more battery engagement features configured to retain the first and second external battery packs in the deployed position when the first and second external battery packs are attached to the respective first and second battery interface members.

In another more limited aspect, the one or more engagement features include one or both of first and second upstanding tabs disposed on opposing transverse sides of the locking plate and configured to engage a surface of the first and second external battery packs, respectively, when the first and second external battery packs are attached to the respective first and second battery interface members and in the deployed position; and one or more upstanding lugs having a dual dovetail cross-sectional shape and configured to simultaneously engage a pair of dovetail channels disposed on the first and second external battery packs when the first and second external battery packs are attached to the respective first and second battery interface members and in the deployed position.

In another more limited aspect, a battery adaptor in combination with first and second external battery packs is provided.

In a further aspect, a method of mounting first and second external battery packs to a weapon includes attaching a battery adapter to an accessory rail associated with the weapon, wherein the battery adapter includes a housing having a first side and a second side transversely spaced apart from the first side; a first axially extending side wall disposed on the first side, a second axially extending side wall disposed on the second side, and an axially extending channel disposed intermediate the first and second side walls, the axially extending channel having a cross-sectional profile configured to physically and electrically mate with a portion of a weapon accessory mounting rail; a first battery pack interface member hingedly coupled to the first side and a second battery pack interface member hingedly coupled to the housing side, the first battery pack interface member configured to physically and electrically mate with the first external battery pack and the second external battery pack interface member configured to physically and electrically mate with the second external battery pack; and each of the first battery pack interface member and the second battery pack interface member being pivotal between a first functional orientation configured to rotate the first external battery pack and the second external battery pack, respectively, between a deployed position configured for normal operation of the first external battery pack and the second external battery pack, respectively, and an accessible position configured for attachment and detachment of the first external battery pack and the second external battery pack, respectively. The first external battery pack is attached to the first battery pack interface member and the second external battery pack is attached to the second battery pack interface member.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
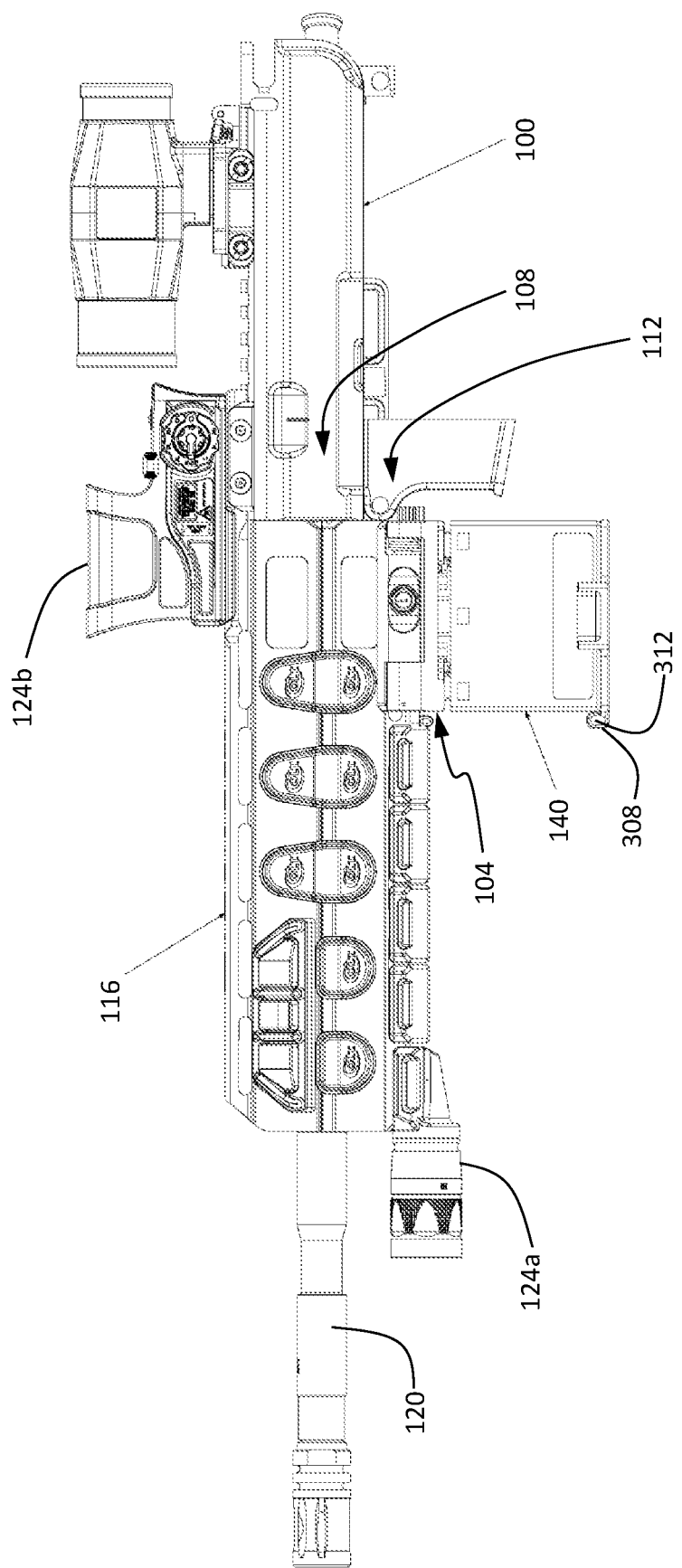
FIG. 1 is a side view of a weapon having a battery pack adapter in accordance with an exemplary embodiment of the present invention.
Figure 2:
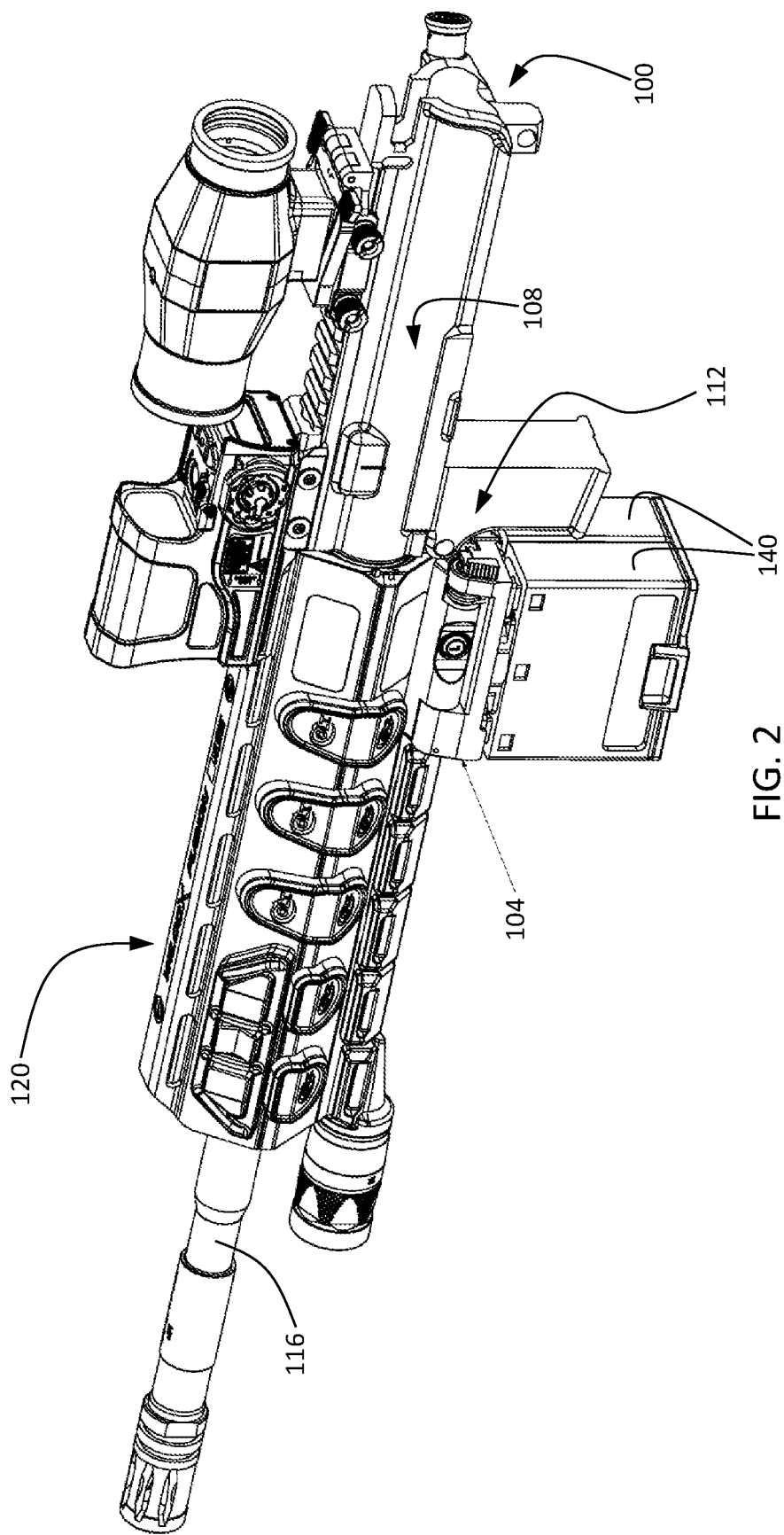
FIGS. 2 and 3 are isometric views of the weapon and battery pack adapter appearing in FIG. 1.
Figure 3:
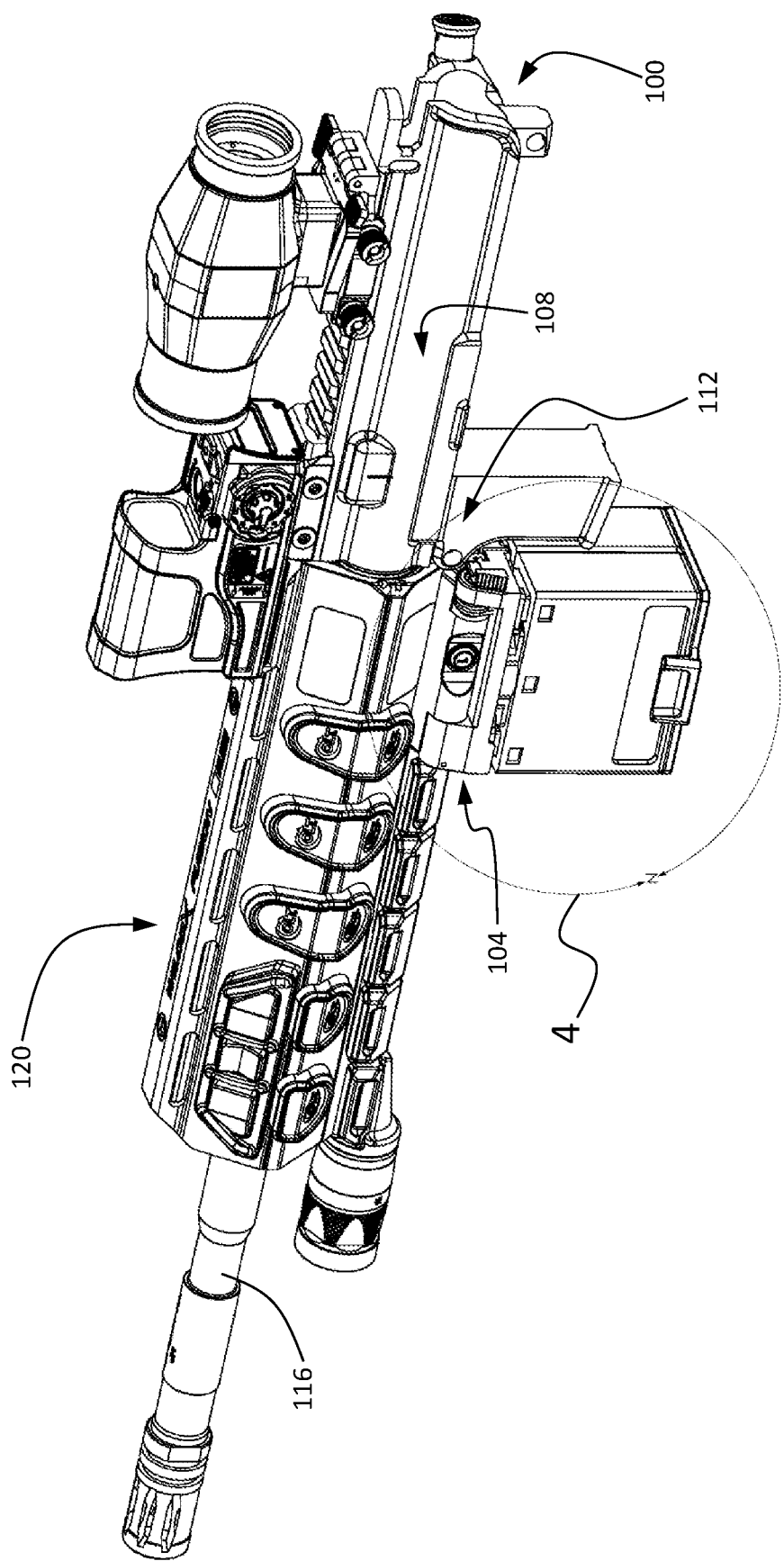
Figure 4:
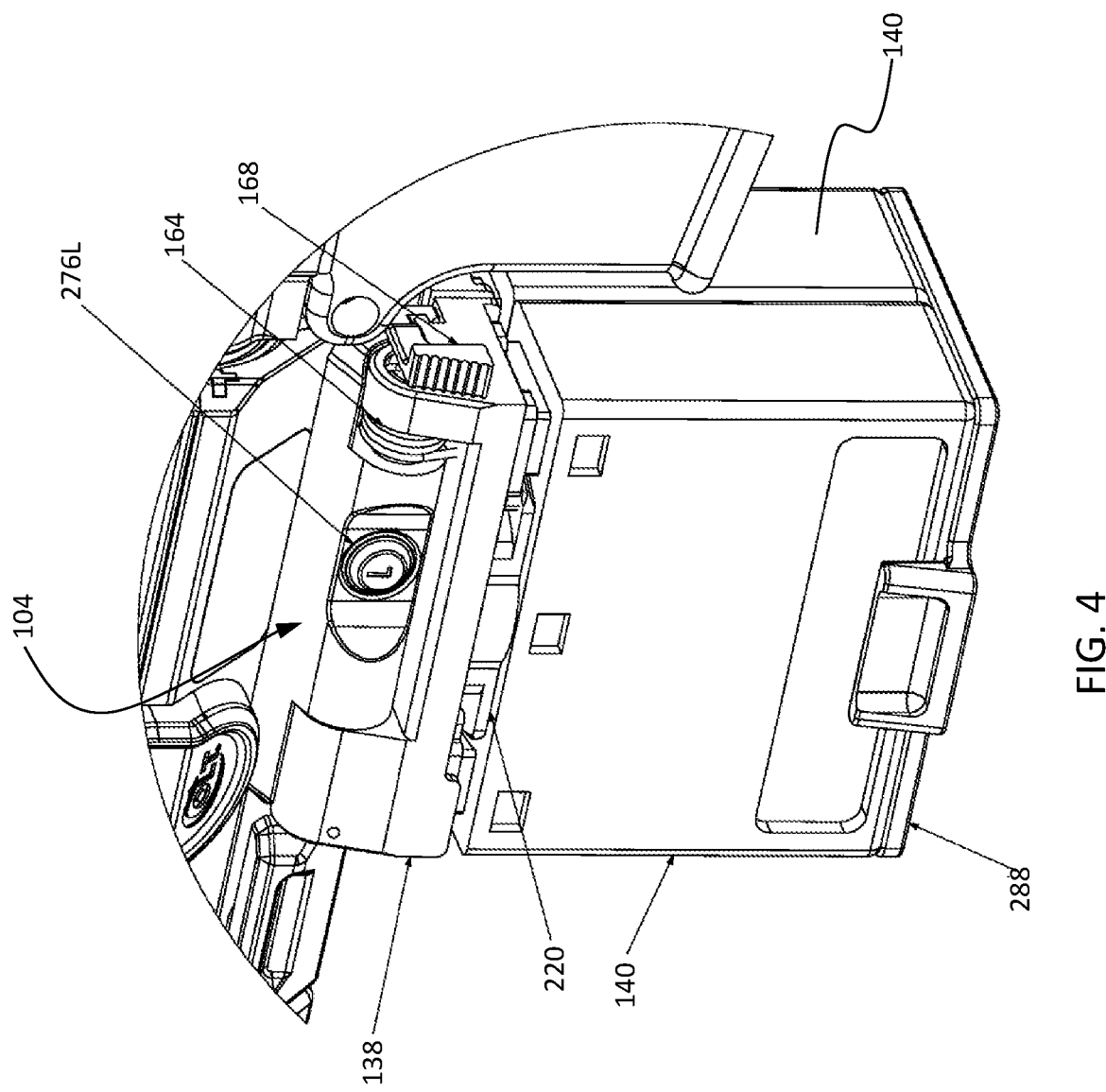
FIG. 4 is an enlarged view of the region 4 appearing in FIG. 3.
Figure 5:
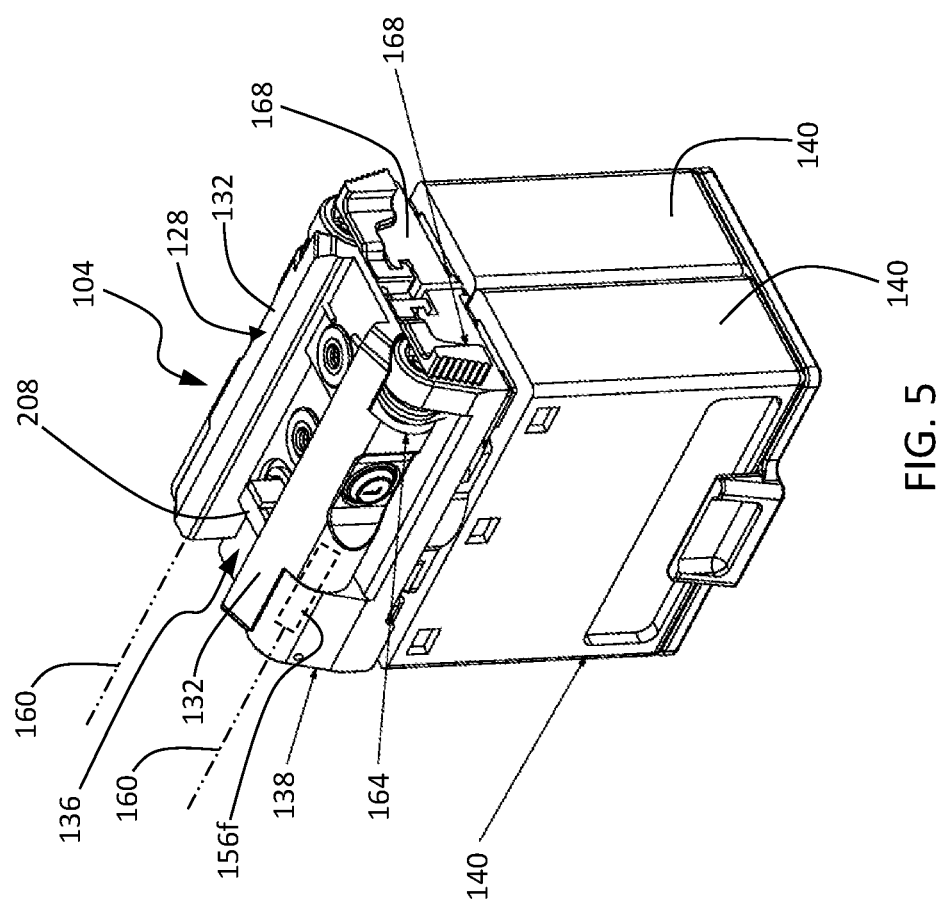
FIG. 5 is an enlarged isometric view of the battery pack adapter and battery packs appearing in FIG. 1, taken generally from above, the left side, and the rear.
Figure 6:
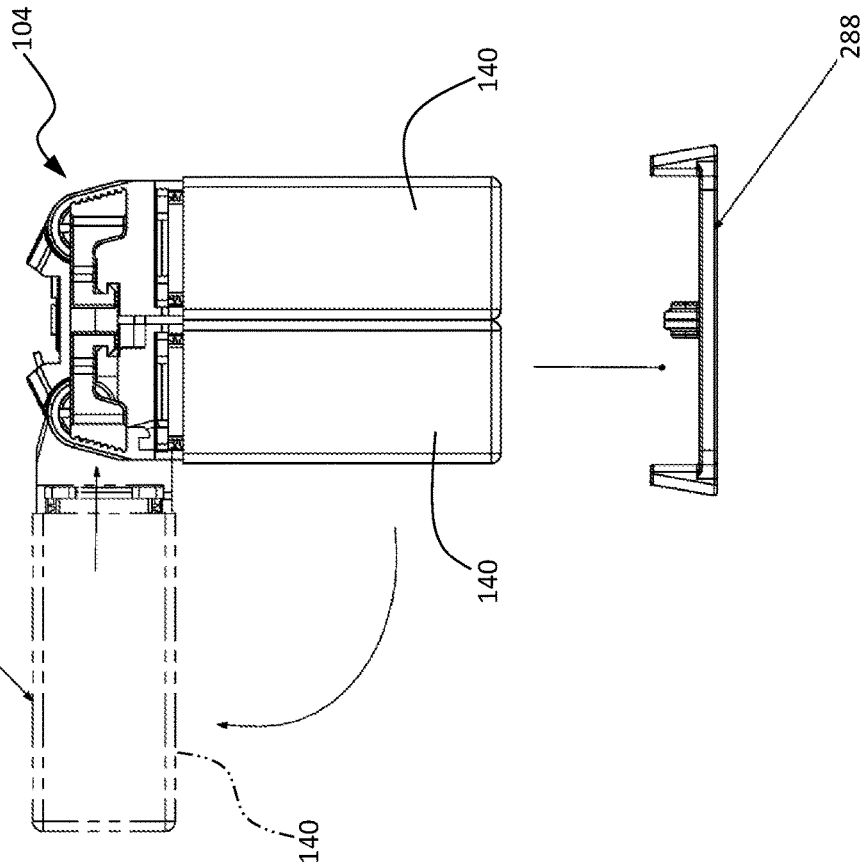
FIG. 6 is an enlarged, partially exploded rear view of the battery pack adapter and battery packs appearing in FIG. 1, illustrating the pivoting movement of the battery pack adapter hinge.
Figure 7:
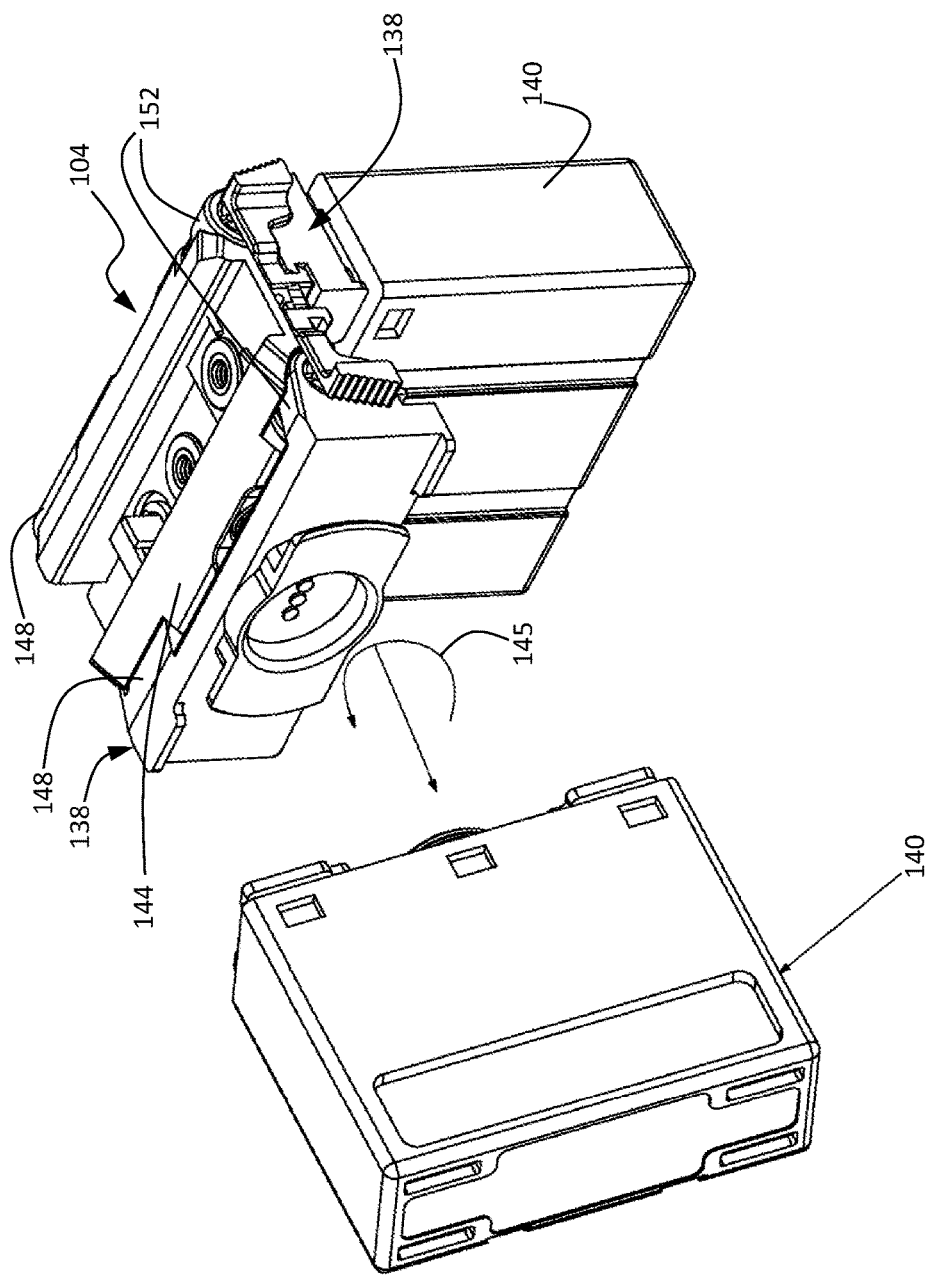
FIG. 7 is an enlarged, partially exploded isometric view of the battery pack adapter and battery packs appearing in FIG. 1, and illustrating the twist lock interface.
Figure 8:
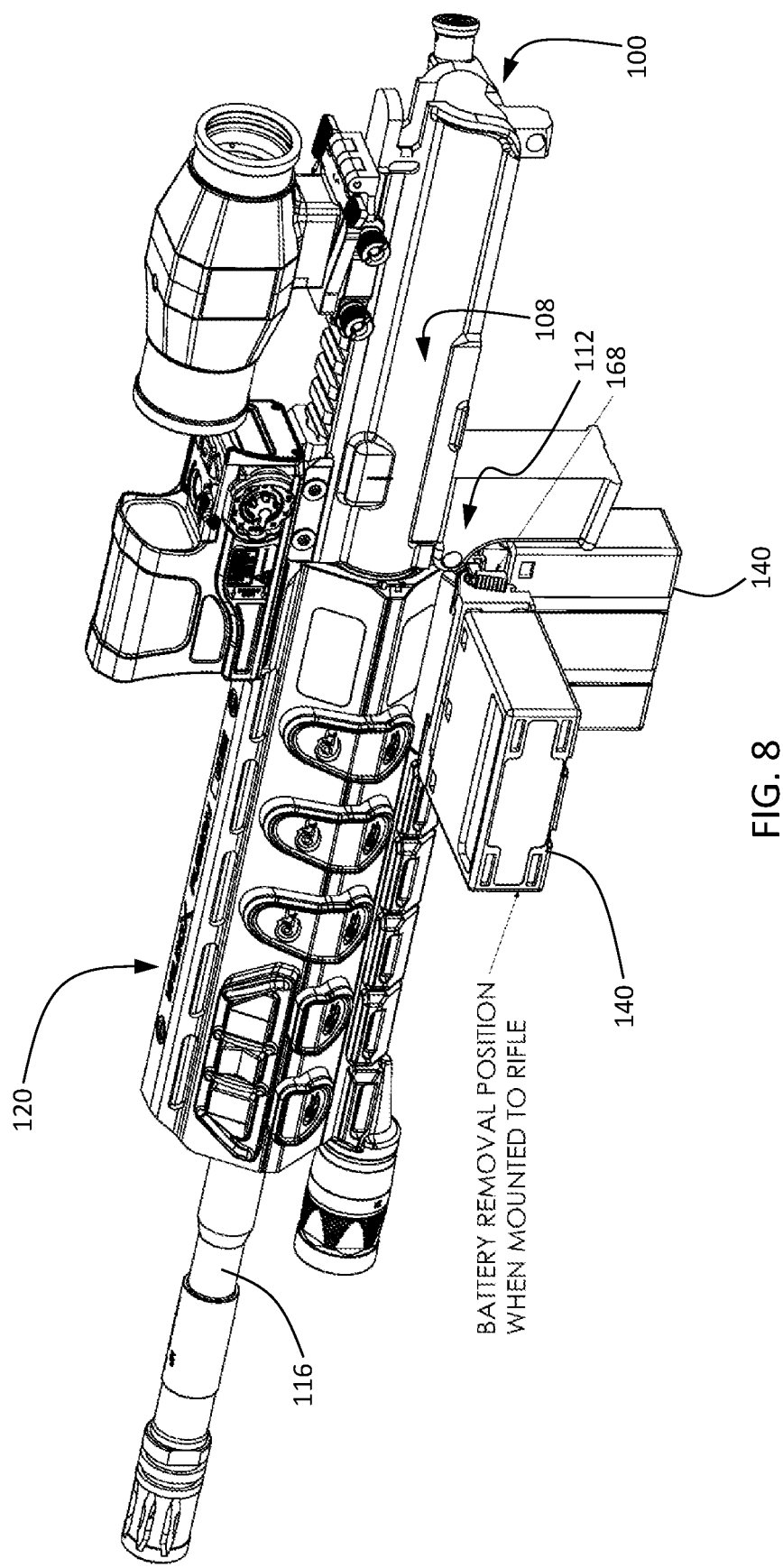
FIG. 8 is an isometric view of the weapon and battery pack adapter appearing in FIG. 1 wherein one of the battery packs is pivoted to a position for battery removal when the adapter is mounted to the weapon.
Figure 9:
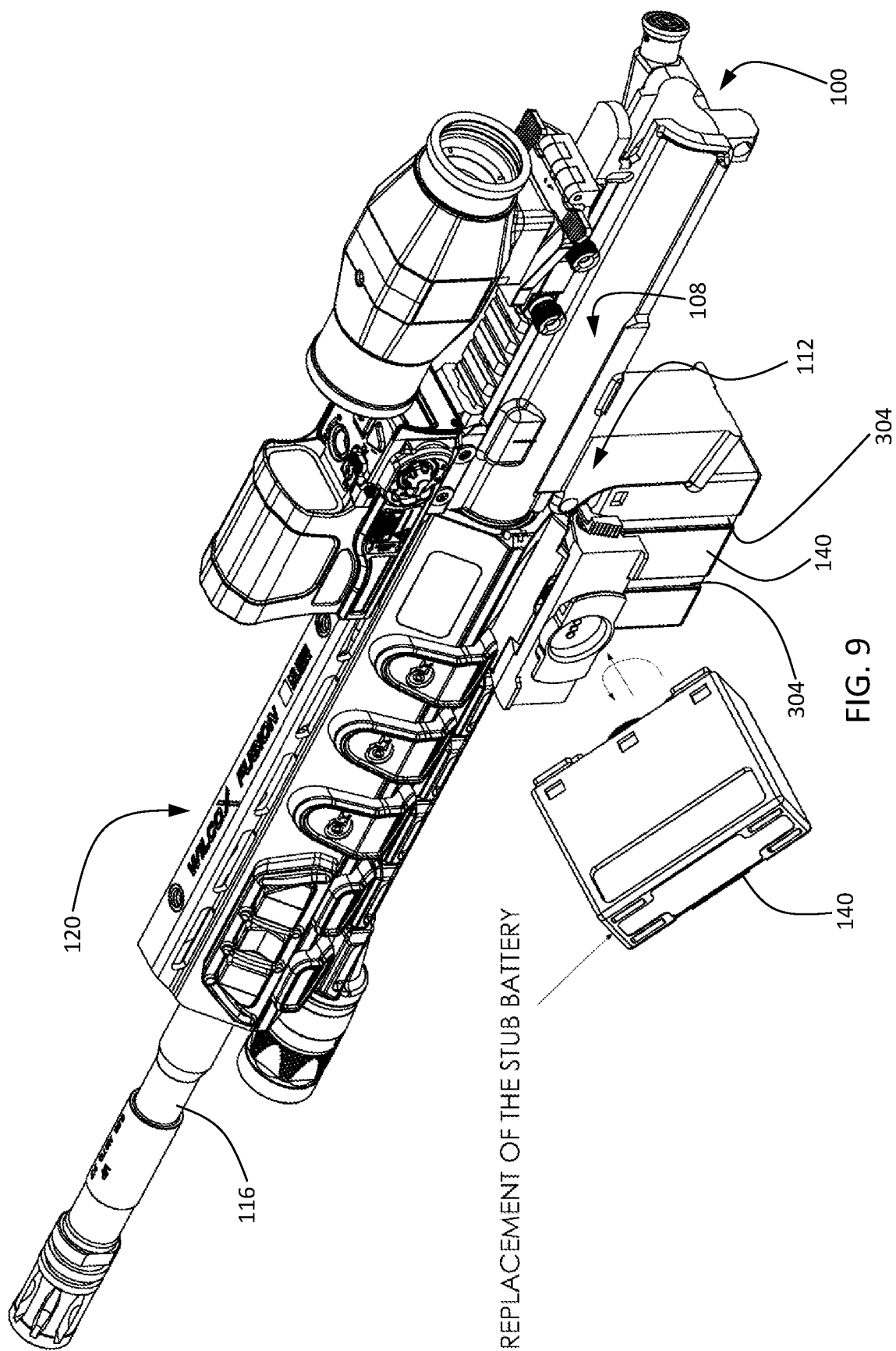
FIG. 9 is an isometric, partially exploded view of the weapon and battery pack adapter appearing in FIG. 1 wherein one of the adapter hinge interfaces is pivoted to a position for battery attachment when the adapter is mounted to the weapon.

Reference will now be made in detail to presently preferred embodiments of the invention, one or more examples of which are illustrated in the accompanying drawings. Each example is provided by way of explanation of the invention, not limitation of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

As used in this application, the terms "front," "rear," "upper," "lower," "upwardly," "downwardly," "left," "right," and other orientation descriptors are intended to facilitate the description of the exemplary embodiment(s) of the present invention, and are not intended to limit the structure thereof to any particular position or orientation.

All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

Referring now to the drawings, FIGS. 1-4 illustrate a weapon 100 having a battery pack adapter 104 removably attached thereto. The weapon 100 is illustrated with the upper receiver 108, lower receiver 112 (partial view), a powered accessory rail mounting system 120, and a barrel 116, wherein the rearward portion of the lower receiver and the buttstock portion of the weapon 100 have been omitted for ease of illustration. Exemplary accessory devices 124a (flashlight module) and 124b (reflex sighting system) are coupled to the rail mounting system 120 and are in electrical communication with the adapter 104 via conductive circuit elements in the rail mounting system 120.

Figure 21:
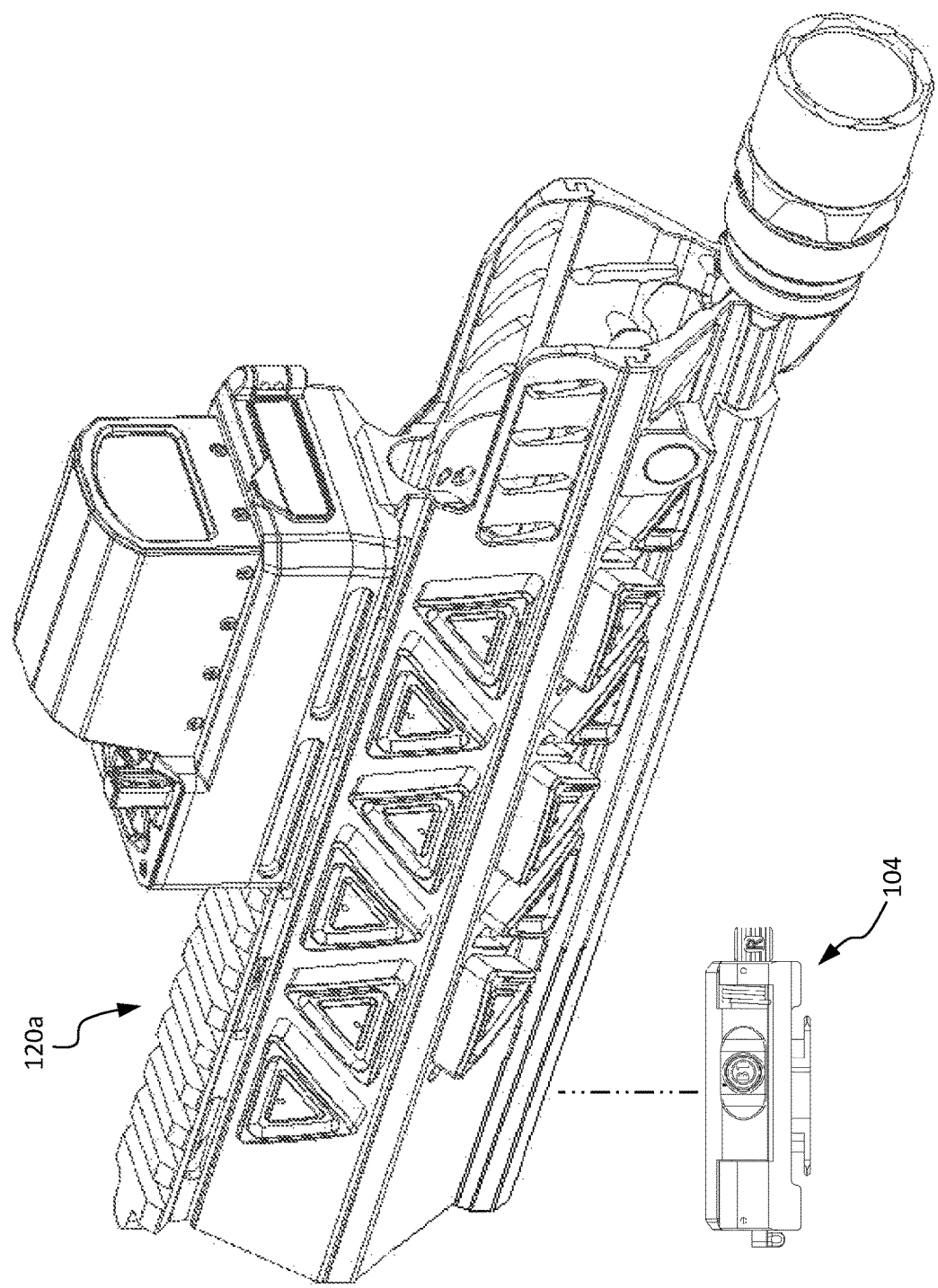
FIGS. 21 and 22 illustrate the battery pack adapter herein configured for use with alternative powered rail system.
Figure 22:
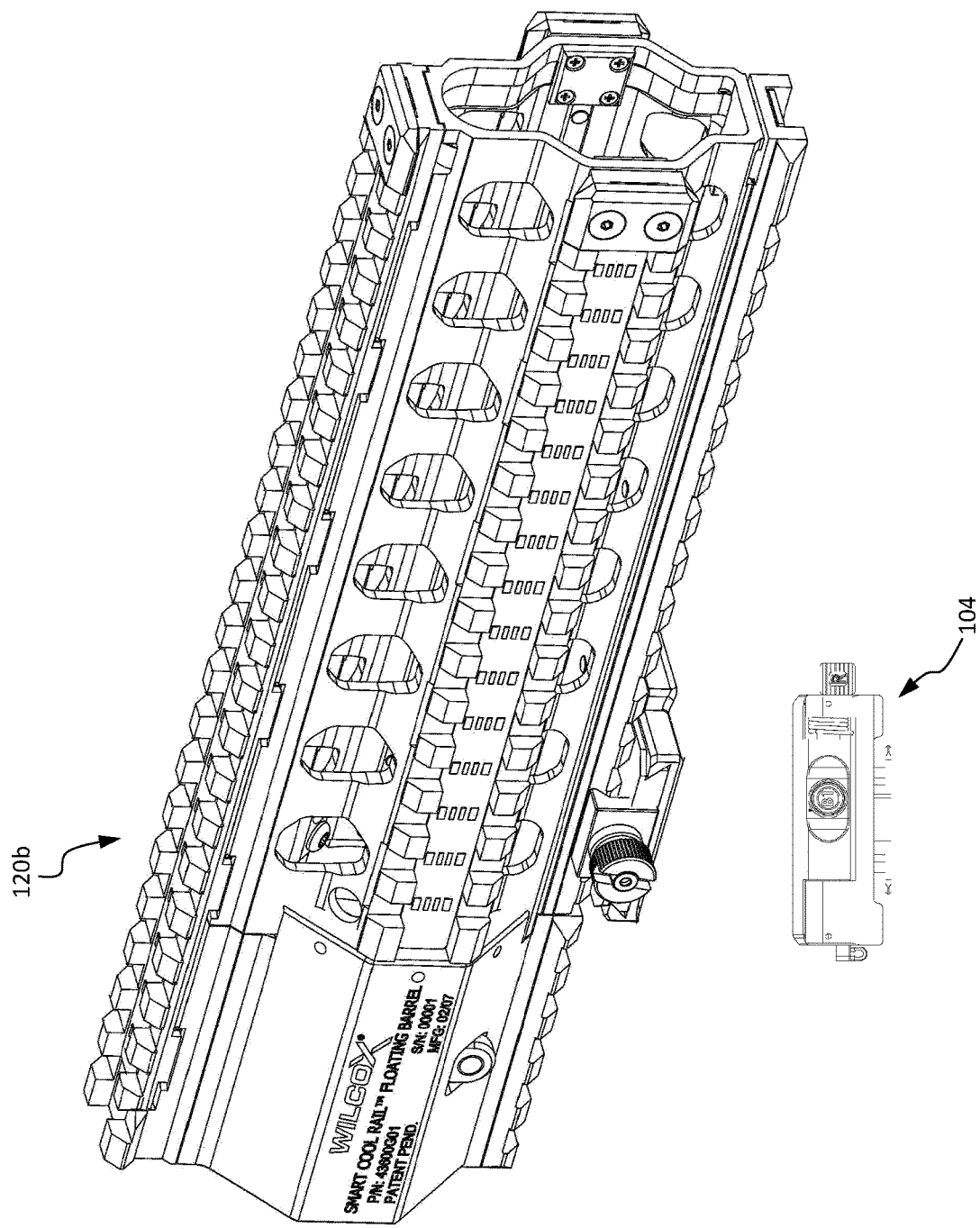

In the illustrated embodiment, the adapter 104 is configured for attachment to a FUSION™ system available from Wilcox Industries Corp. of Newington, NH. In certain embodiments, the rail mounting system 120 may be as shown and described in commonly owned U.S. Pat. No. 10,969,202 issued Apr. 6, 2021, the entire contents of which are incorporated herein by reference in its entirety. In certain embodiments, the adapter 104 may be configured for coupling to other powered accessory rail systems as are known in the art, including powered Picatinny (MIL-STD-1913 or STANAG 2324) type rail systems, such as the powered rail system 120a appearing in FIG. 21 or the powered rail system 120b appearing in FIG. 22. In certain embodiments, the powered rail system 120a may be as shown and described in commonly owned U.S. Pat. No. 10,557,687 issued Feb. 11, 2020. In certain embodiments, the powered rail system 120a may be as shown and described in commonly owned U.S. Pat. No. 10,557,687 issued Feb. 11, 2020, which is incorporated herein by reference in its entirety. In certain embodiments, the powered rail system 120b may be as shown and described in commonly owned U.S. Pat. No. 8,091,265 issued Jan. 10, 2012, which is incorporated herein by reference in its entirety.

Referring now to FIGS. 5-9, and with continued reference to FIGS. 1-4, the adapter 104 includes a center rail receiving module 128 having a housing which defines axially-extending side walls 132 on opposing sides of an axially-extending channel 136, the channel 136 having a cross-sectional profile configured to receive a portion of the mounting rail 120. Left and right side battery pack interface members 138 are hingedly attached to the center portion 128. Each battery pack interface member 138 is configured to detachably receive a battery pack 140. The center rail receiving portion 128 includes left and right center hinge knuckles 144, where each knuckle 144 is disposed intermediate front and rear hinge knuckles 148, 152 on the left and right battery pack interface members 138, respectively. Each of the left and right hinges pivot about internal front and rear pivot pins 156f, 156r and pivot around a respective pivot axis 160. In the preferred embodiments, the battery packs 140 are Small Tactical Universal Batteries (STUB). In embodiments, the battery pack 140 has a twist lock interface. To attach a battery, when the interface member 138 is in the accessible position, the battery pack 140 is aligned at a generally right angle with respect to the axial direction of the interface member 138 and rotated about 90 degrees as indicated by the arrow 145 appearing in FIG. 7. To remove the battery pack 140, the process is reversed, wherein once the battery pack is pivoted to the accessible or removal position, the user rotated the battery pack 140 about 90 degrees and pulls to remove.

Left and right torsion springs 164 bias the left and right side battery pack interface members 138, respectively, toward the outwardly pivoted position (see FIG. 7), sometimes referred to herein as the accessible position or removal position. To secure the battery packs in the locked position, sometimes referred to herein as the deployed position, the user manually pivots the battery packs 140 to the inwardly pivoted position against the urging of the torsion springs 164.

Figure 10:
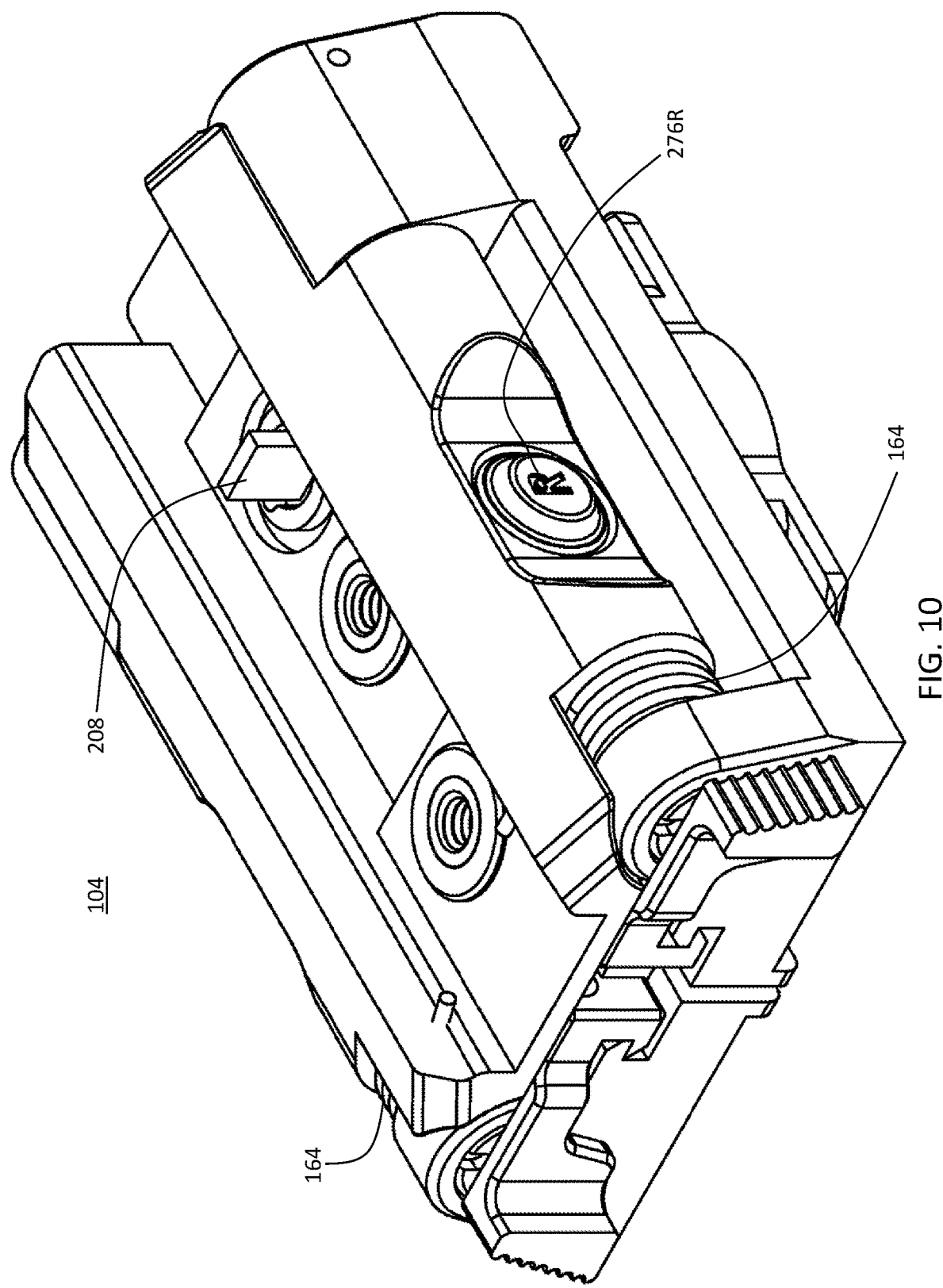
FIG. 10 is an enlarged isometric view of the battery pack adapter appearing in FIG. 1, taken generally from above, the right side, and the rear.
Figure 11:
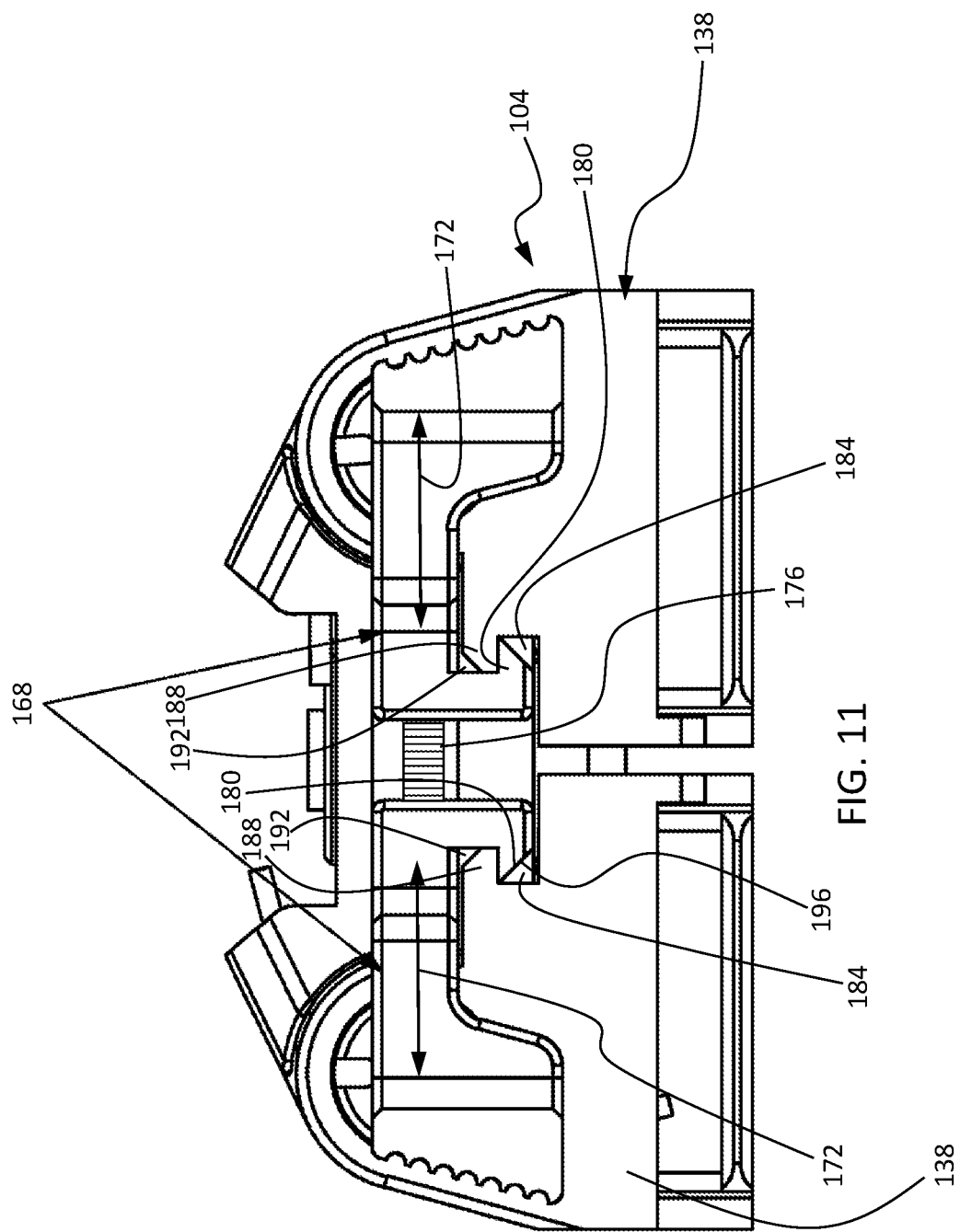
FIG. 11 is an enlarged rear view of the battery pack adapter appearing in FIG. 1, taken generally from the rear.

Referring now to FIGS. 10 and 11, and with continued reference to FIGS. 1-9, the battery pack interface members 138 are secured in the inwardly pivoted position via lock levers 168. The lock levers 168 are slidable in the transverse direction in relation to the central member 128 as indicated by the arrows 172 (see FIG. 7). A spring or other resiliently compressible member 176 is disposed intermediate the lock levers 168 to urge the lock levers 168 outwardly, away from each other. In certain embodiments, the lock levers 168 may include indicia 170 (see FIG. 25), such as the letter "R" indicating the release function.

The lock levers 168 each include a latching portion 180 which is removably received within a recess or catch 184 on the respective battery pack interface member 138. The battery pack interface members 138 likewise each include a latching portion 188 which is removably received within a recess or catch 192 on the lock levers 168. In this manner, the lock levers 168 interlock with the battery pack interface member 138 to secure the battery pack interface member 138 in the downward pivoted position.

To move the battery pack interface member 138 to the outward pivoted position, e.g., to remove, attach, or exchange a battery pack 140, the lock lever 168 is depressed inwardly, against the urging of the spring member 176 until the latch portion 188 disengages catch 192 and the latch 180 disengages the catch 184, whereby the battery pack interface member 138 is pivoted outwardly by the torsion spring 164. To move the battery pack interface member 138 to the locked, inward pivoted position from the outward pivoted position, e.g., after a battery pack 140 has been attached, the battery pack interface member 138 is manually pivoted to the inward pivoted position until the lock lever 168 reengages the battery pack interface member 138. As the battery pack interface member 138 is manually pivoted to the inward pivoted position, a ramped or inclined surface 196 on the latch portion 180 slides past a ramped or inclined surface 200 on the latch member 188 to facilitate the latch members 180, 188 moving past each other during pivoting movement between the outwardly and inwardly pivoted positions.

Figure 12:
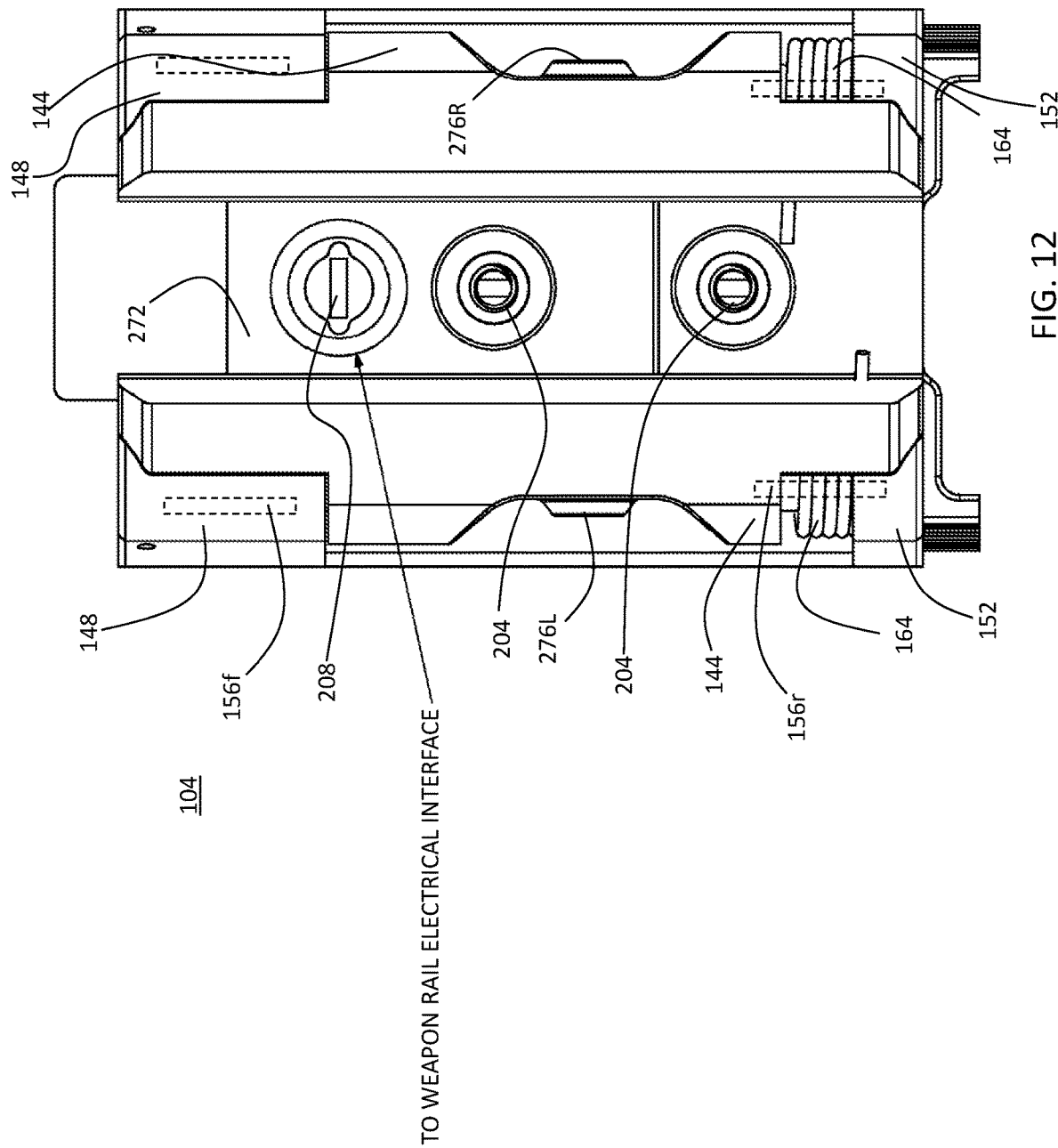
FIG. 12 is an enlarged top plan view of the battery pack adapter appearing in FIG. 1.
Figure 13:
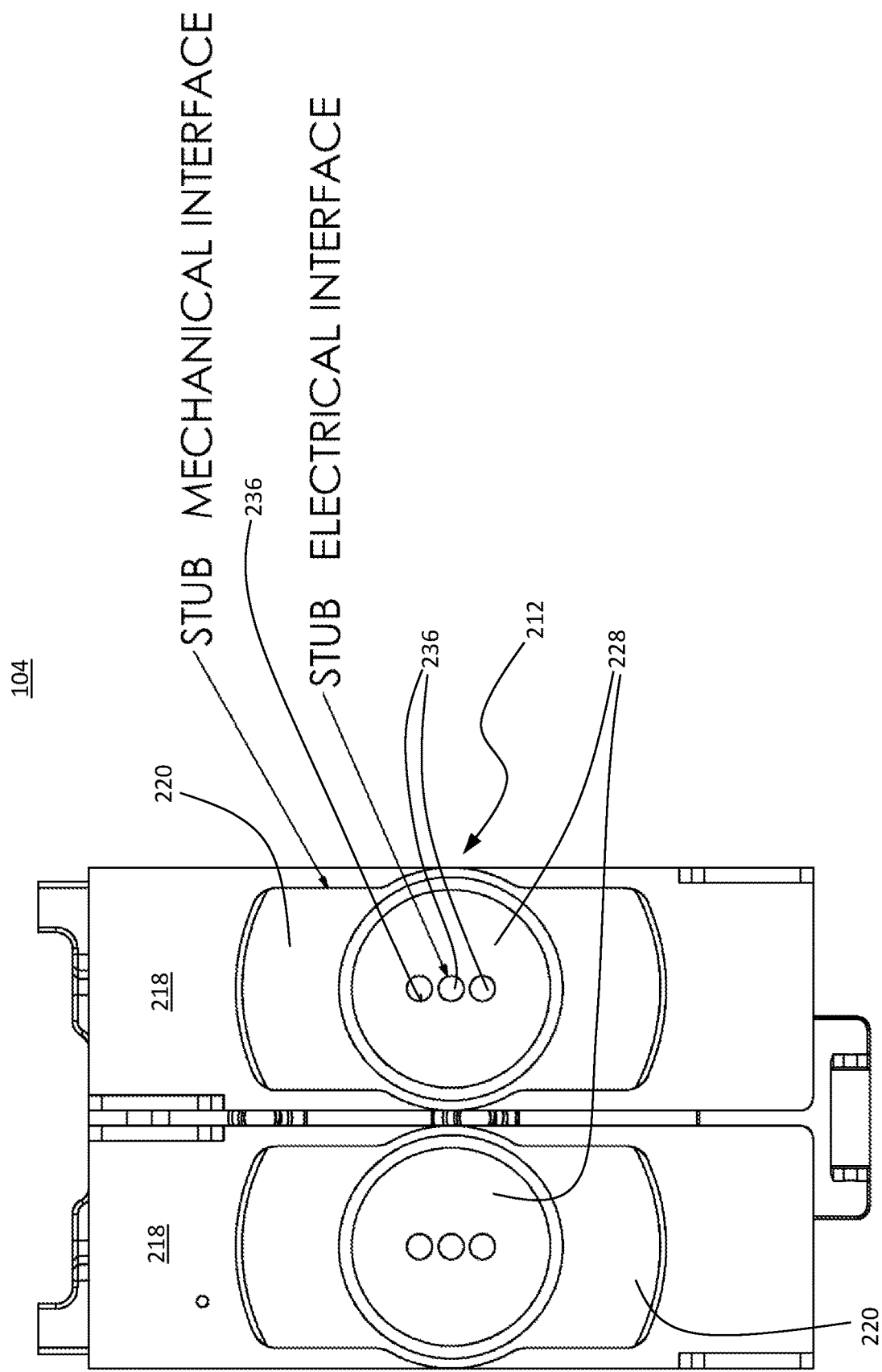
FIGS. 13 and 16 are enlarged top plan views of a pair of battery packs with the adapter removed.
Figure 14:
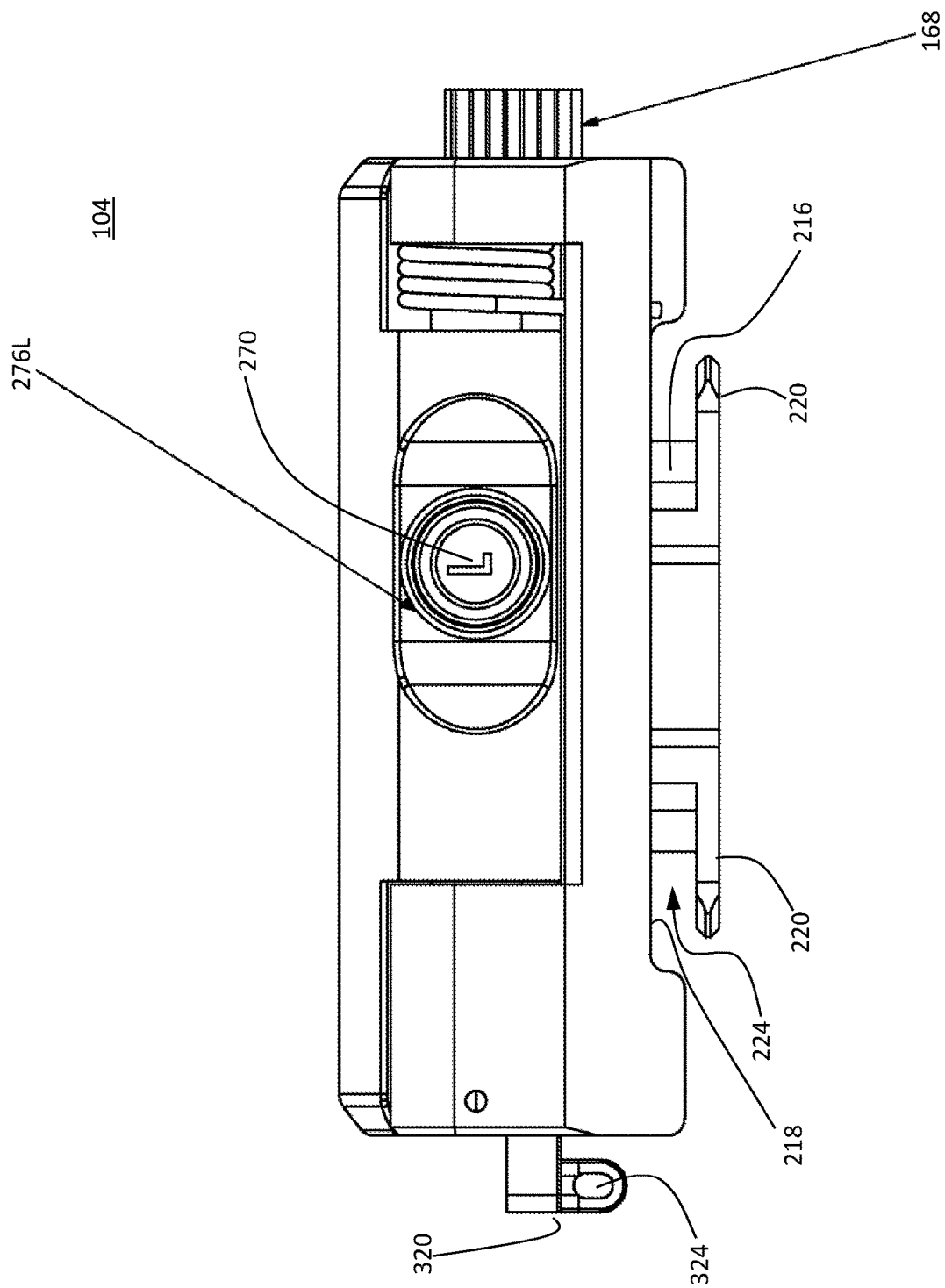
FIG. 14 is an enlarged left side view of the battery pack adapter appearing in FIG. 1.
Figure 15:
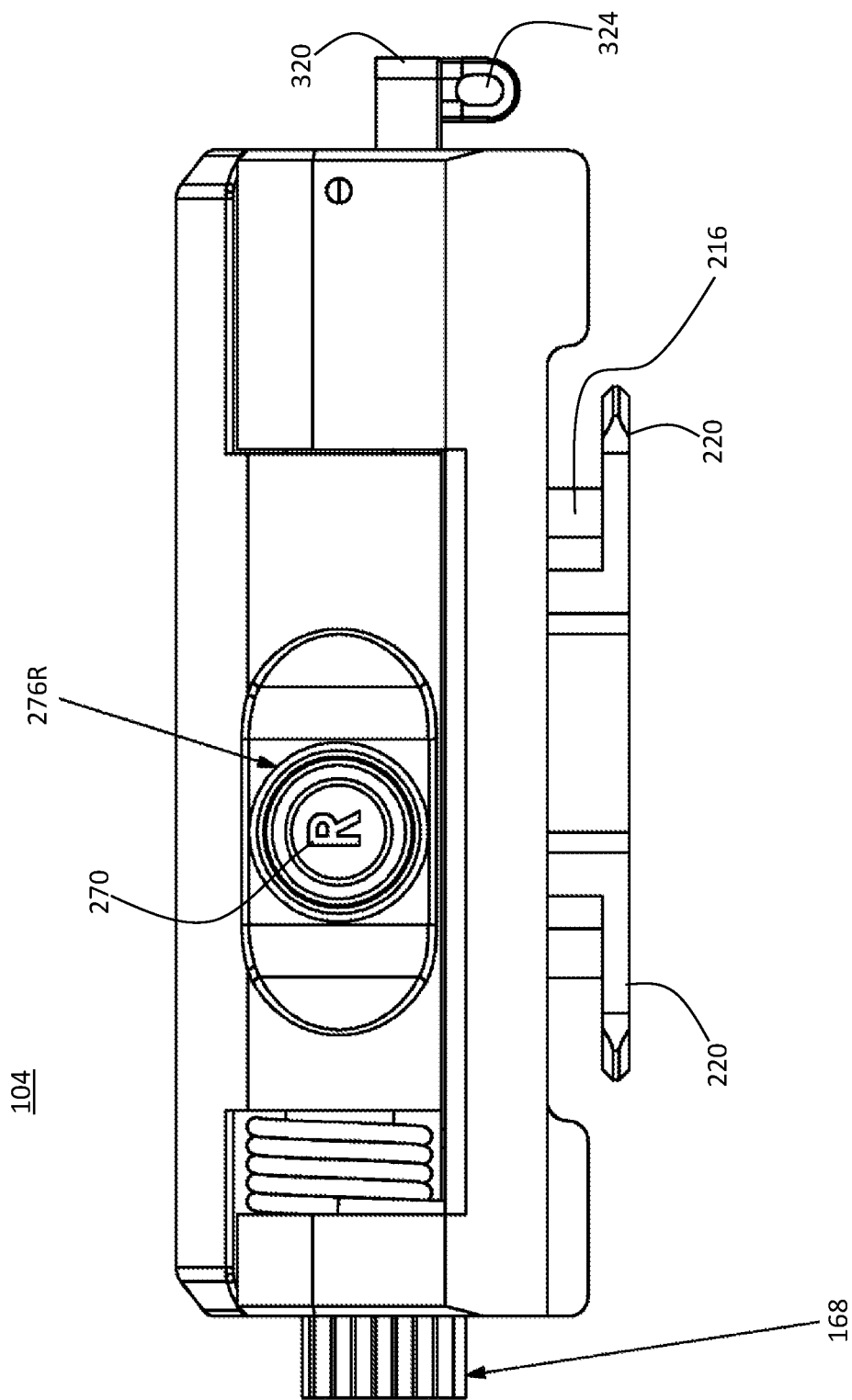
FIG. 15 is an enlarged right side view of the battery pack adapter appearing in FIG. 1.
Figure 16:
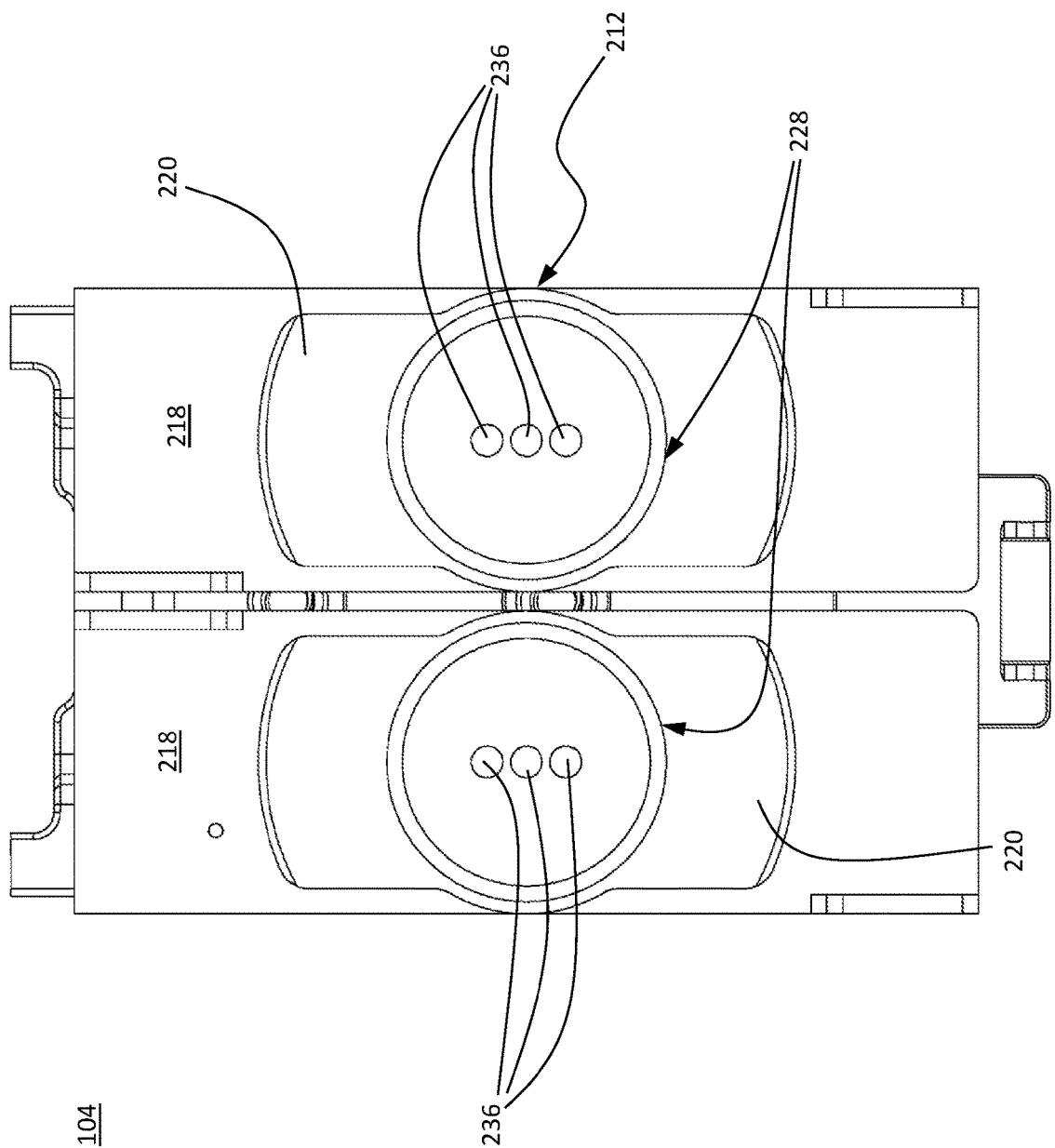

As best seen in FIG. 12, and with continued reference to FIGS. 1-11, the mechanical connection between the adapter 104 and the accessory rail 120 is via threaded fasteners (not shown) which engage openings 204 in the base of the channel 136 and engaging complementary threaded openings (not shown) on the rail 120. The electrical connection between the adapter 104 and the accessory rail 120 is via a male multi-pin connector 208 which engages a complementary female multi-pin connector (not shown) on the rail 120. In certain embodiments, the multi-pin connector 208 includes pins for power and ground. In certain embodiments, the multi-pin connector 208 additionally includes pins for data and control signals as well as ground, drain, and so forth.

Referring now to FIGS. 13-16, and with continued reference to FIGS. 1-12, battery pack interface member 138 includes a bayonet type mount 212 including a center post 216 extending from a surface 218 and opposing ears 220. The ears 220 extend from the post 216 to define a retention groove 224 between each of the ears 220 and the surface 218. A center terminal 228 on the bayonet mount assembly 212 is aligned with a center terminal 232 on the battery pack 140, which includes terminals 236 that are electrically coupled to terminals on the multi-pin connector 208. The terminals 236 are electrically coupled to terminals 240 on the battery pack 140 when the battery pack 140 is coupled to the battery pack interface member 138.

Figure 17:
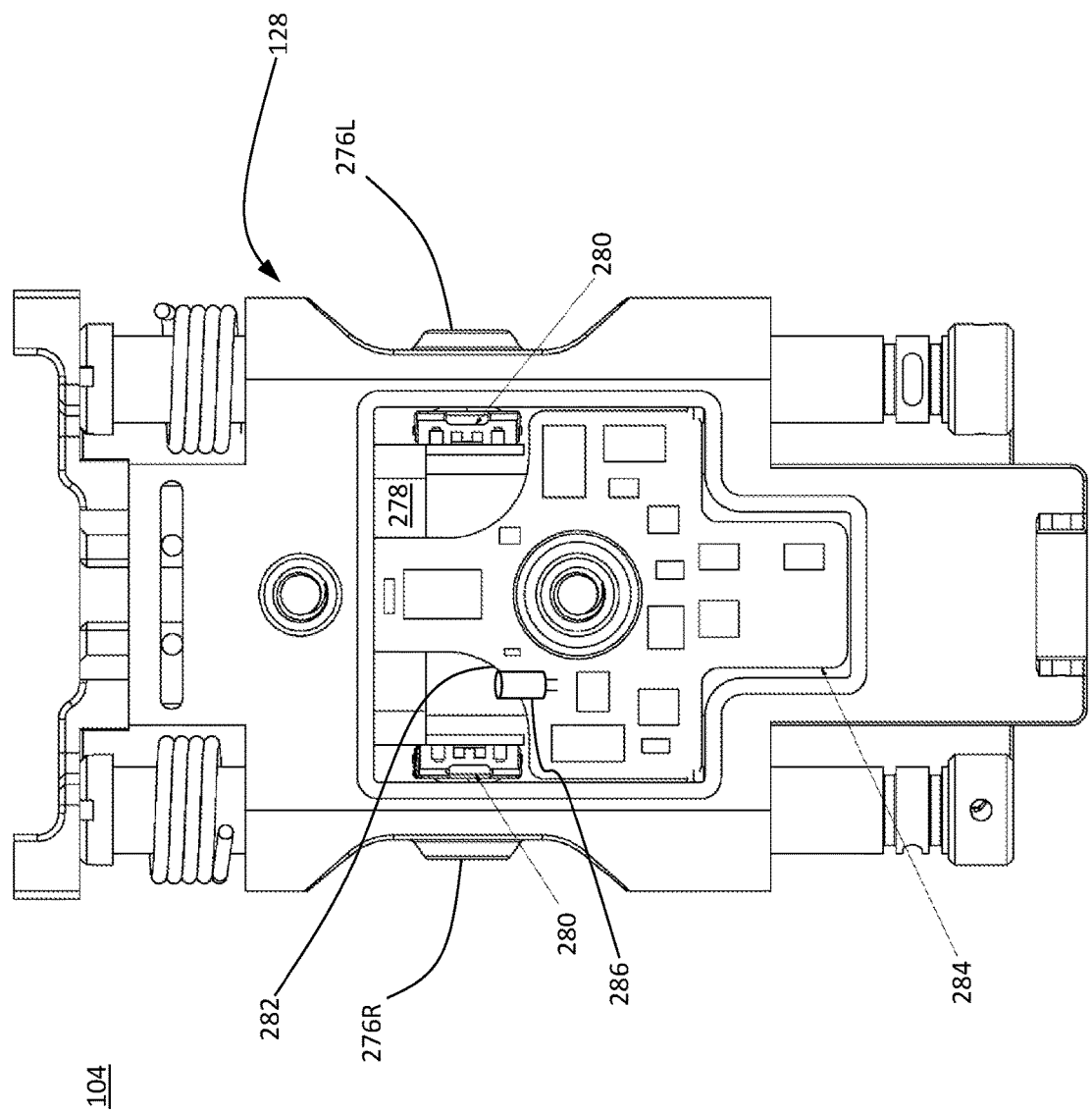
FIG. 17 is an enlarged top plan view of the battery pack adapter with the hinge interface members and upper plate removed.

Referring now to FIG. 17, and with continued reference to FIGS. 1-16, there is shown the center rail receiving portion 128, with the hinge interface members 138 and center channel circuit board cover plate 272 removed for ease of exposition. Left and right manually actuatable battery selector buttons 276L, 276R are disposed on the center rail receiving portion. The battery selector buttons 276L, 276R are disposed over respective switches 280 on a circuit board 282 disposed within a circuit board cavity or receptacle 278 in the center module 128. In embodiments, the switches 280 are normally open, momentary contact switches. When the right selector button 276R is depressed, the battery pack center module 128 electrically couples the right battery pack 140 to the powered rail 120. When the left selector button 276L is depressed, the center module 128 electrically couples the left battery pack 140 to the powered rail 120.

In embodiments, switching is performed via control logic implemented on the circuit board 284. In embodiments, the control logic is implemented in a computer-based processing unit, such as a microprocessor or microcontroller having an associated memory and a program of instructions executable by the computer based processing unit. In embodiments, the processing unit is a programmable logic device (PLD), field programmable gate array (FPGA), field programmable object array (FPOA), or the like wherein configuration data for the logic functions is loaded from an external memory device such as a non-volatile memory device.

In operation, the user may use one of the battery packs 140 until it is depleted or nearly depleted and then use the selector switch 276L, 276R as appropriate to switch the electrical connection to the other one of the battery packs 140. In certain embodiments, the selector buttons 276L, 276R may include indicia 270 such as "L" and "R," respectively, to designate the left and right battery packs, or alternately "B1" and "B2" to designate first and second battery packs.

In embodiments, the selector buttons 276L, 276R allow switching between the left and right battery packs 140 without interruption to the power being supplied to the powered rail 120. The circuitry on the circuit board 282 routing the power includes one or more capacitors 286 for storing electrical energy to act as a temporary power supply for brief periods to ensure that power to the connector 208 and thus to the rail system 120 is not interrupted when switching between battery packs, whether manually or automatically, or when a battery pack is removed and replaced.

This is particularly advantageous when an attached accessory device attached to the powered rail 120 is processor-based device which requires rebooting after power is lost or cycled and/or a networked device which requires reconnection to an associated network when power is lost or cycled, which processes can sometimes take several minutes to complete. In addition, in some processor-based devices, an abrupt loss of power may cause data loss, file corruption, or hardware failure. Each battery pack 140 is individually swappable such that when one battery pack 140 is depleted it can be changed without affecting operation of the devices being powered. In operation, when one of the battery packs 140 is depleted, the user then depresses the selector for the battery pack 140 that is fully charged. The depleted battery pack 140 can then be removed from the center module 128.

In embodiments, control logic is provided on the circuit board 284 to switch automatically between the left and right battery packs 140 under preprogrammed control. For example, in certain embodiments, programmed control logic on the circuit board 284 is configured to automatically determine which battery 140 is operational, wherein the left and right selector buttons 276L, 276R are used to manually override the preprogrammed control logic. In certain embodiments, control logic is provided on the circuit board 284 to automatically switch from one battery to the other under preprogrammed control when the currently operational battery is depleted, or when the state of charge fall below some threshold value, without the need for the user to manually switch from one battery to the other using the buttons 276L, 276R. In certain embodiments, power switching from one battery source to the other is performed by an electromagnetic device such as a relay or a semiconductor device such as a transistor (e.g., a metal-oxide-semiconductor field-effect transistor (MOSFET) in combination with voltage detection circuits, such that when the voltage of one battery pack drops below a predetermined level, the semiconductor device automatically switch the power source to the other battery pack. In certain embodiments, the battery packs include so-called smart battery features such as built in circuitry that outputs information about their state of charge to the control logic within the battery pack adapter 104. In embodiments, automatic switching of the battery packs is performed responsive to battery charge state or other parameter such as battery temperature communicated from the battery pack to the battery pack adapter 104.

Figure 18:
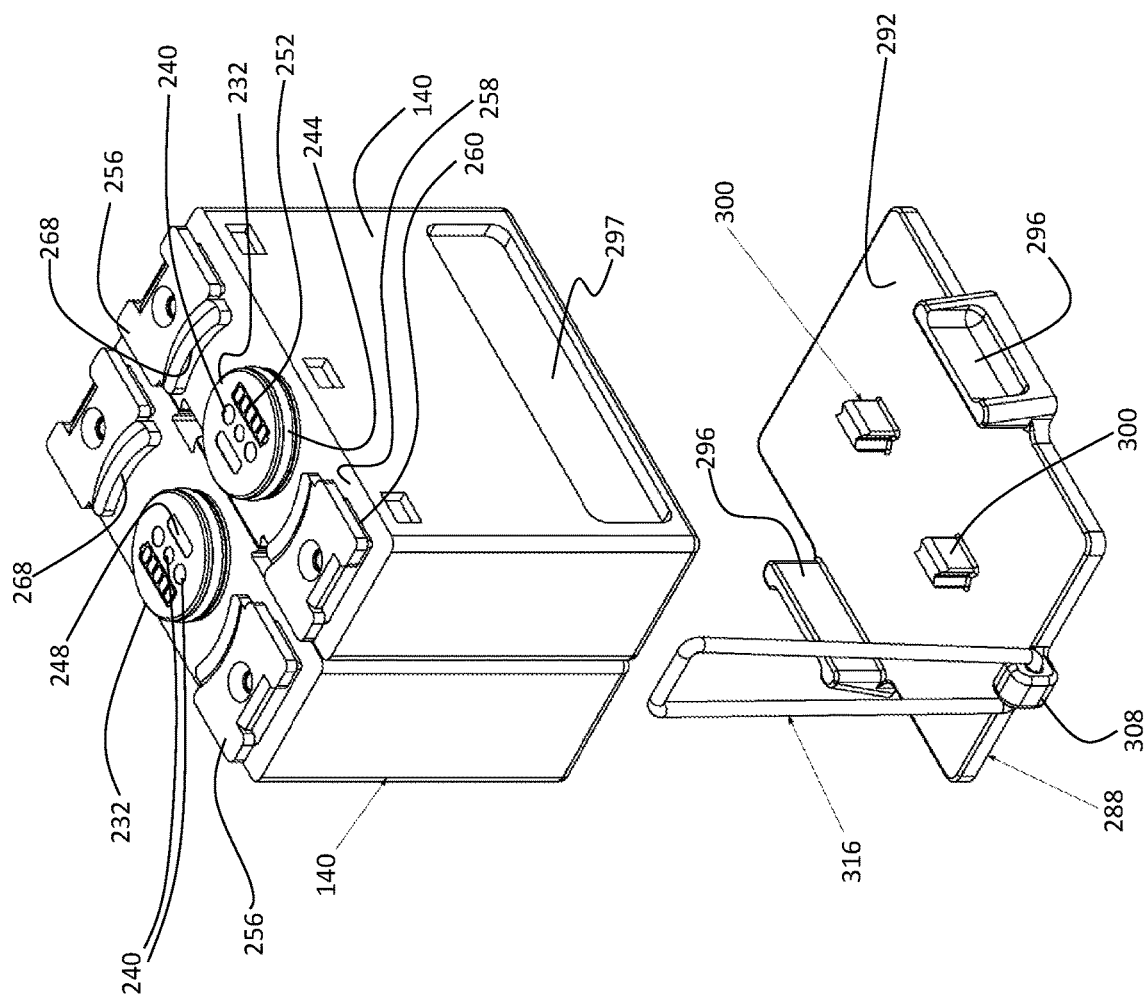
FIG. 18 is an isometric, partially exploded view of the battery packs and locking plate.
Figure 19:
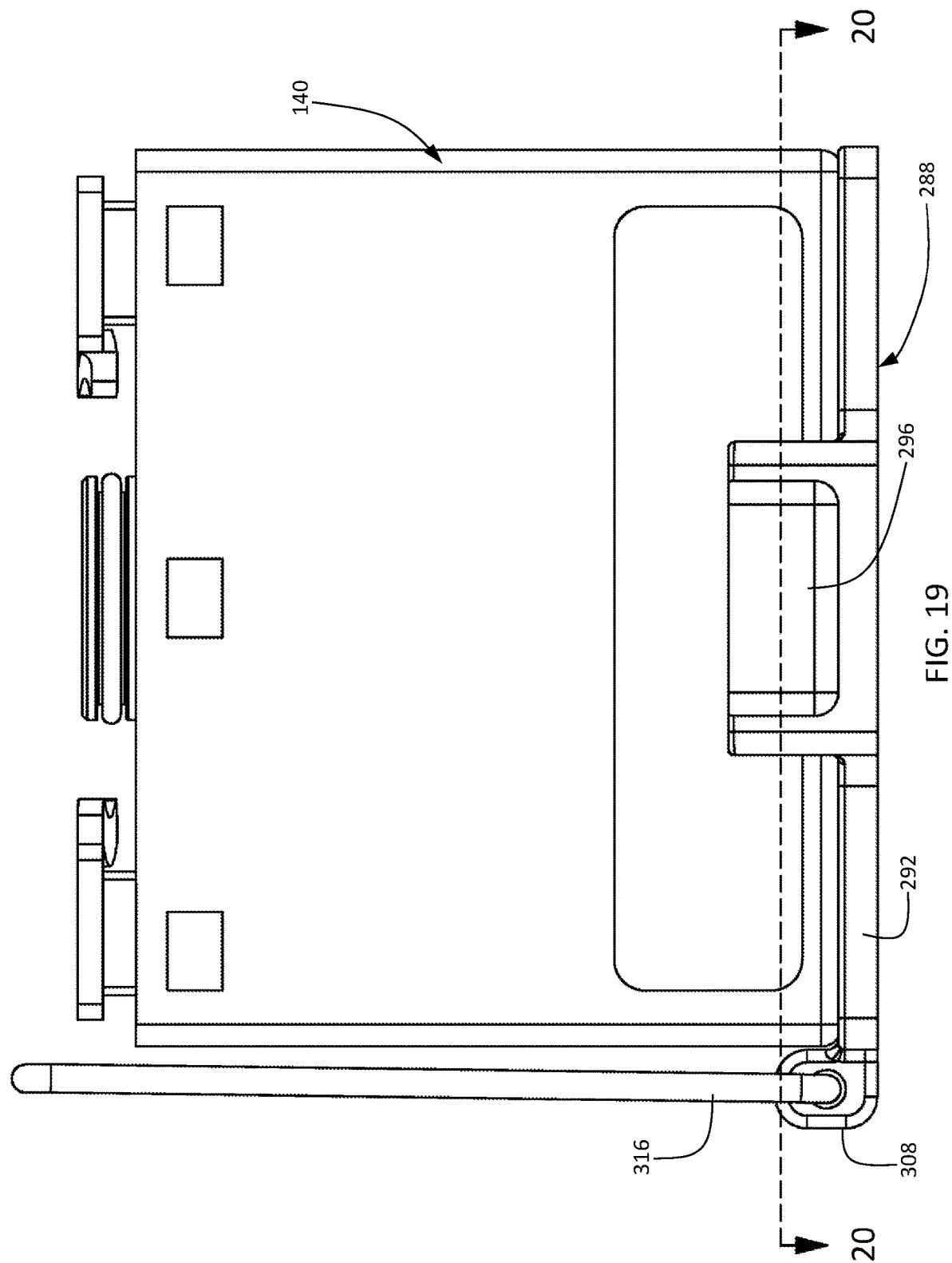
FIG. 19 an enlarged left side view of the battery packs and locking plate.
Figure 20:
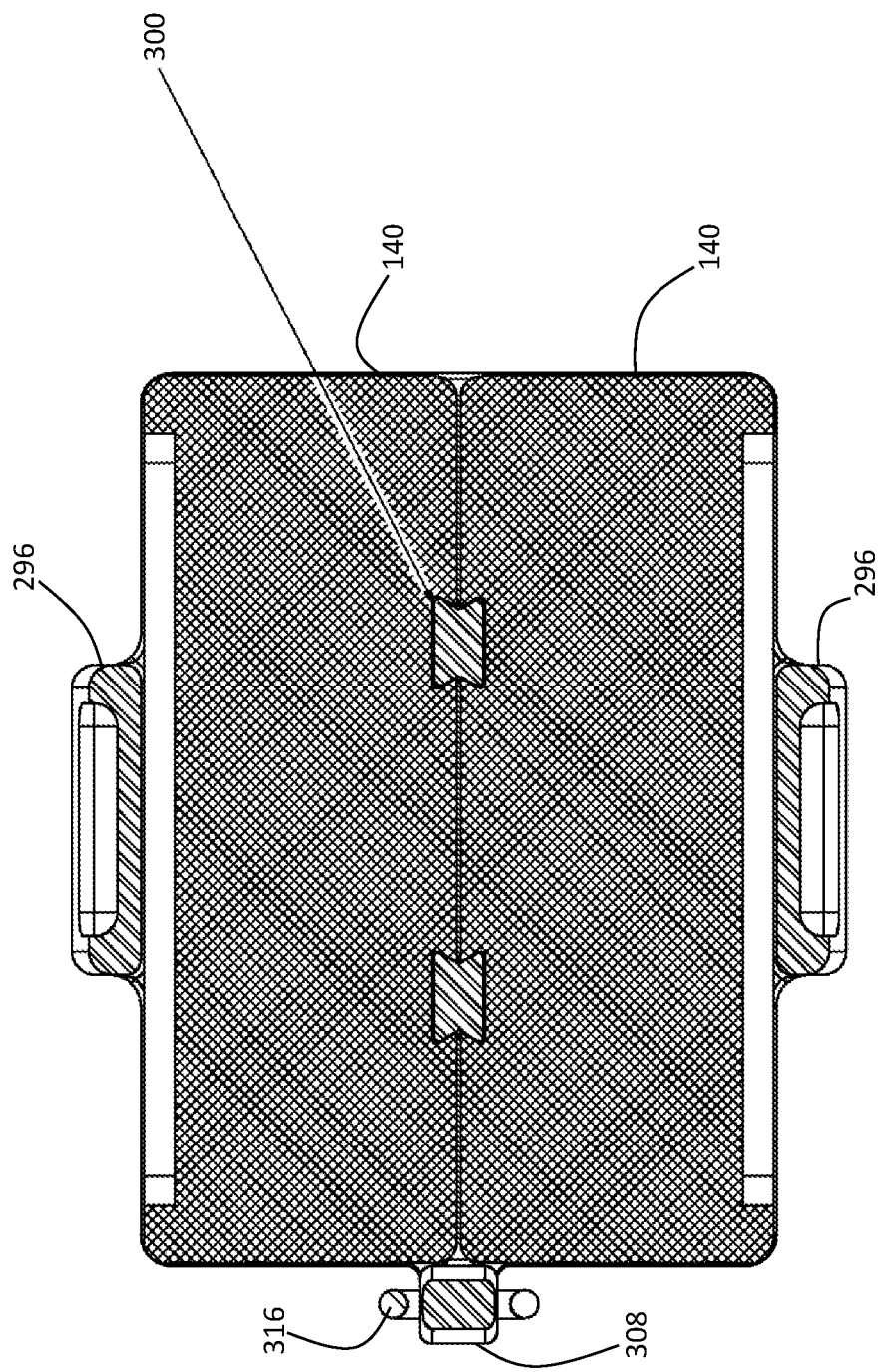
FIG. 20 is cross-sectional view of the battery packs and locking plate taken along the lines 20-20 appearing in FIG. 19.

Referring now to FIGS. 18-20, and with continued reference to FIGS. 1-17, the battery packs 140 each comprise an interface including a center terminal 232. The center terminal 232 includes an elastomeric sealing ring 244 for sealing between the terminal 232 and the housing of the battery pack 140. The terminal 232 includes a USB-C charging port 248, power and control signal terminals 240, and state of charge indicia 252.

Tabs 256 are disposed at opposing ends of the battery pack 140 on an interface surface 258 thereof, and are supported on respective posts or bosses 260 to define a peripheral retention channel 264 between the tabs 256 and the interface surface 258. The tabs 256 include bayonet or align and twist type retention elements 268 for attachment of the battery pack 140 to the adapter surface 218 via twisting movement of the battery pack 140 relative to the STUB adapter interface surface 218, as indicated by the rotation directional arrows in FIGS. 7 and 9.

In the illustrated embodiment, the batteries 140 are secured together at their distal ends with a locking plate 288. The locking plate 288 includes a base member 292 and opposing tabs 296 disposed on the left and right peripheral edges of the base 292. The batteries 140 are supported on the bottom by the base 292 and the lateral sides by the tabs 296. In certain embodiments, the opposing tabs 296 are configured to resiliently engage complementary recesses 297 disposed on the outward facing side of the battery packs 140. In this manner, the tabs 296 and recesses 297 provide a detent mechanism resisting removal of the base plate 292 when it is secured to a pair of attached battery packs 140. Alternately, the opposing tabs 296 are configured to secure the locking plate 288 to the battery packs 140 via a friction fit or press fit. The upstanding tabs 296 also resist pivoting movement from the deployed position to the accessible position. In operation, the locking plate 288 is removed prior to depressing the battery unlocking lever 168.

In embodiments, locking lugs 300 extend upwardly from the base 262 and have a generally hourglass or dual dovetail shaped cross-sectional shape that is complementary with aligned and facing dovetail channels 304 (see FIG. 9) formed in the housing of the battery packs 140. The dual dovetail shaped lugs 300 keep the two battery packs 140 aligned and also resist pivoting movement from the deployed position to the accessible position.

A first tether cord attachment member 308 is disposed on a front edge of the plate 288 and includes an opening 312. A second tether cord attachment member 320 is disposed on a front edge of the center module 128 and includes an opening 324 (see FIGS. 14 and 15). A tether 316 forming a loop of flexible cord, wire, or the like passes through the openings 316 and 324 to tether the locking plate 288 to the center module 128.

Figure 23:
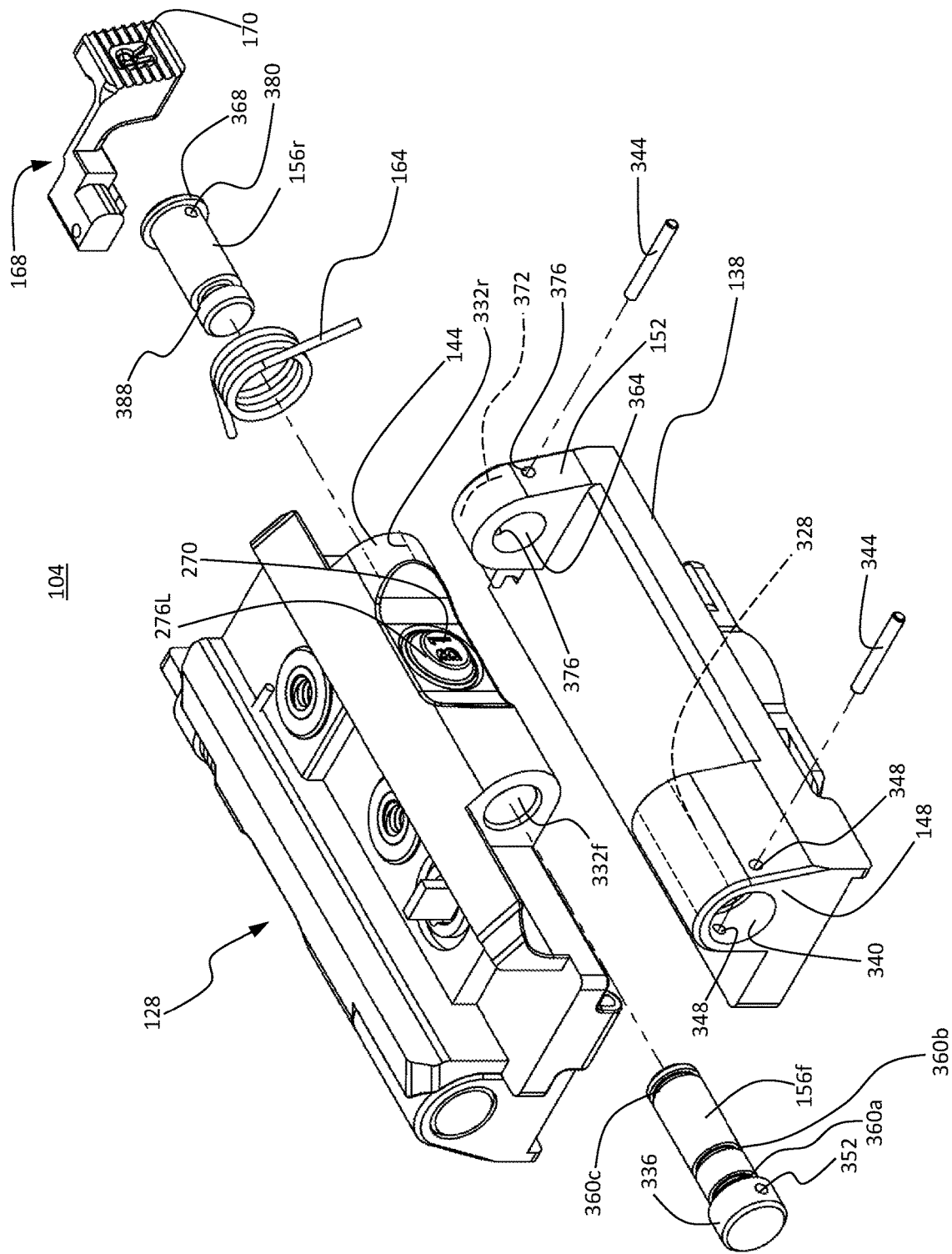
FIG. 23 is an exploded isometric view of the adapter center module hinge assembly.
Figure 24:
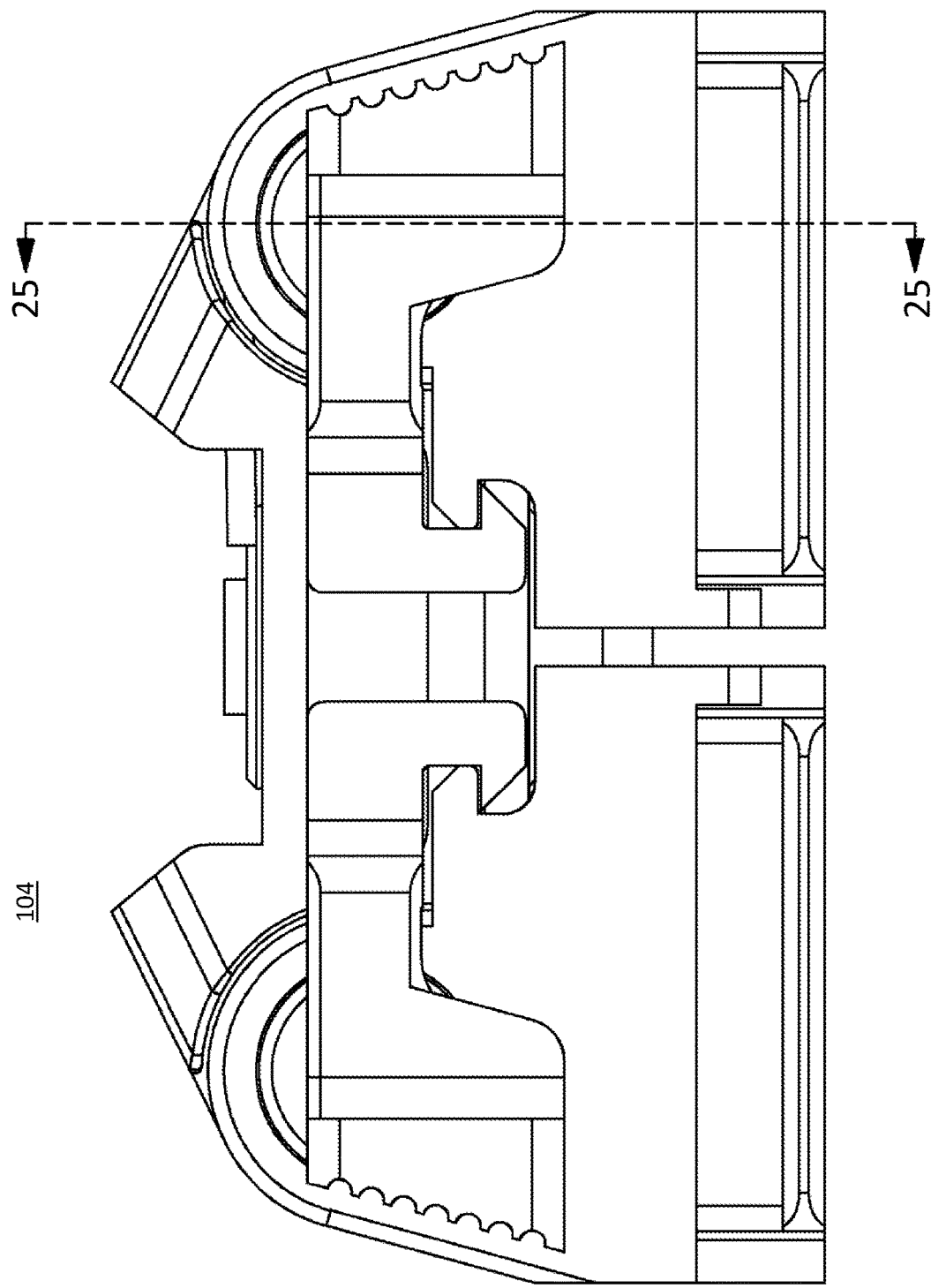
FIG. 24 is an end view of the adapter center module.
Figure 25:
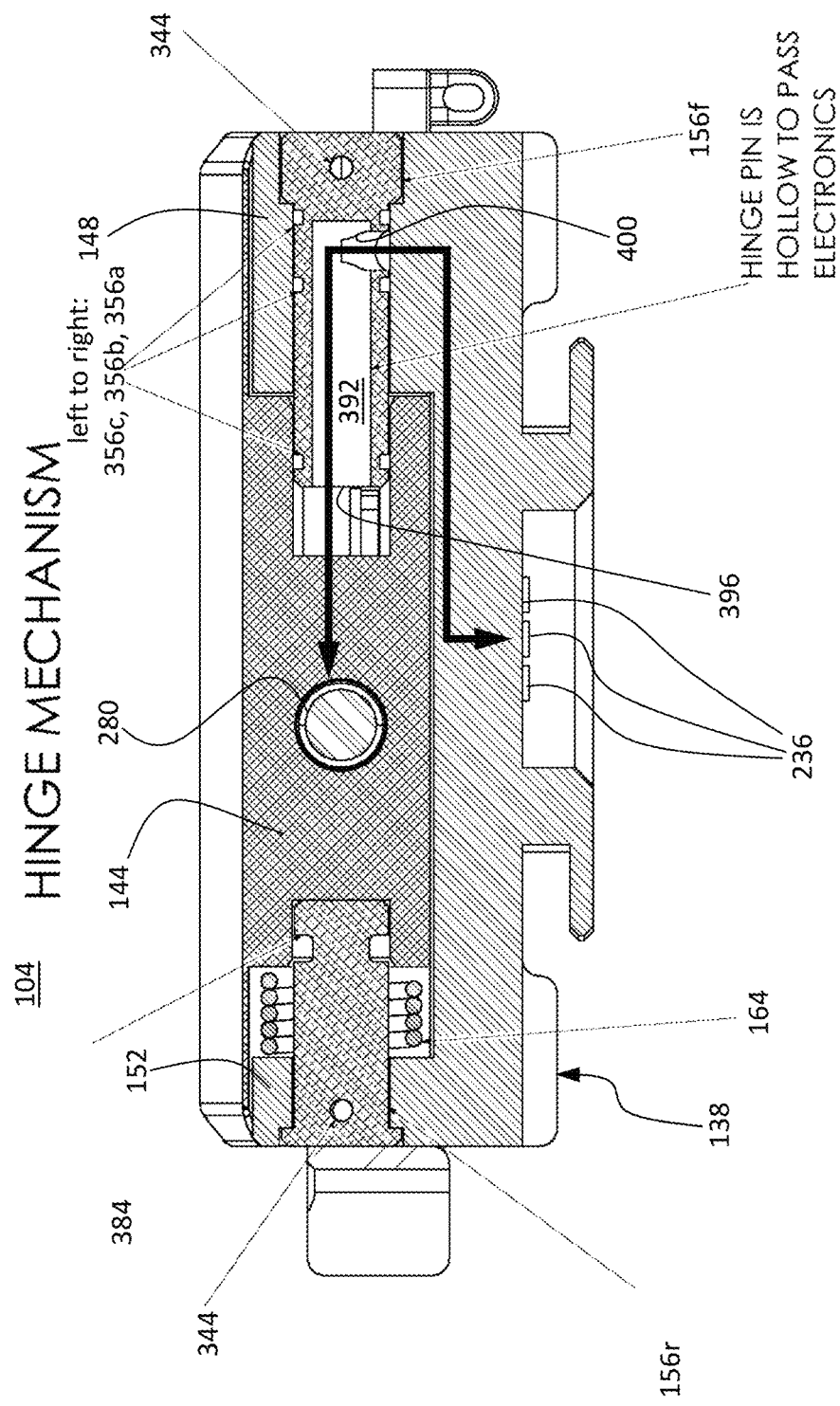
FIG. 25 is a side cross-sectional view taken along the lines 25-25 appearing in FIG. 24.

Referring now to FIGS. 23-25 and with continued reference to FIGS. 1-21, FIG. 23 is an isometric view of the left side hinge assembly, with the right side being a mirror image thereof. The center hinge knuckle 144 on the center module 128 is disposed intermediate the spaced apart hinge knuckles 148, 152 on the battery interface member 138. The front hinge pin 156f passes through a bore 328 formed in the knuckle 148 along the pivot axis 160 and is received within an axial bore 332f in the knuckle 144. The hinge pin 156f has an enlarged diameter head 336, which is received with a counterbore 340 on the knuckle 148. A cross pin 344 passes through openings 348 in the knuckle 148 and an aligned opening 352 in the hinge pin 156f to retain the pin 156f. Elastomeric O-rings 356a, 356b, and 356c are received within annular grooves 360a, 360b, and 360c on the pin 156f to seal against entry of moisture and contamination into the central module 128 via the bore 328. In embodiments, the O-ring 356c also provides increased friction to slow or control pivoting movement of the hinged interface member 138, e.g., when the member 138 is unlocked and pivots outward at the urging of the torsion spring 164.

The rear hinge pin 156r passes through a bore 364 formed in the knuckle 152 along the pivot axis 160 and is received within an axial bore 332r in the knuckle 144. The hinge pin 156r has an enlarged diameter head 368, which is received with a counterbore 372 on the knuckle 144. A cross pin 344 passes through openings 376 in the knuckle 148 and an aligned opening 380 in the hinge pin 156r to retain the pin 156r. An elastomeric O-ring 384 is received within an annular groove 388 on the pin 156r to seal against entry of moisture and contamination into the central module 128 via the bore 364. In embodiments, the O-ring 384 also provides increased friction to slow or control pivoting movement of the hinged interface member 138, e.g., when the member 138 is unlocked and pivots outward at the urging of the torsion spring 164.

As best seen in FIG. 25, the hinge pin 156f is hollow and defines an axial passageway 392 which is open at a distal end 396 of the pin 156f. The shaft of the pin 156f also includes an opening 400 which provides a passageway to electrical contacts 236 on the hinged battery pack interface member 138. In this manner, circuitry may pass through the pin 156f to electrically couple the circuit board 284 and switch 280 electronics in the center module 128 to the contacts 236 on the battery pack interface member 138 as indicated by the arrows.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A battery adapter, comprising:
a housing having a first side and a second side transversely spaced apart from the first side;
a first axially extending side wall disposed on the first side, a second axially extending side wall disposed on the second side, and an axially extending channel disposed intermediate the first and second side walls, the axially extending channel having a cross-sectional profile configured to physically and electrically mate with a portion of a weapon accessory mounting rail;

a first battery pack interface member hingedly coupled to the first side and a second battery pack interface member hingedly coupled to the second side, the first battery pack interface member configured to physically and electrically mate with a first external battery pack and the second battery pack interface member configured to physically and electrically mate with a second external battery pack; and each of the first battery pack interface member and the second battery pack interface member being pivotal between a deployed position configured for normal operation of the first external battery pack and the second external battery pack, respectively, and an accessible position configured for attachment and detachment of the first external battery pack and the second external battery pack, respectively.

2. The battery adaptor of claim 1, further comprising electronic circuitry disposed within the housing electrically coupled to a first electrical connector disposed on the first battery pack interface member and a second electrical connector disposed on the second battery pack interface member, the first and second electrical connectors configured for electrical coupling to the first and second external battery packs, respectively.

3. The battery adaptor of claim 2, further comprising:
a third electrical connector disposed within the axially extending channel; and
the electronic circuitry comprising power switching circuitry for coupling the third electrical connector to a selected one of the first electrical connector and the second electrical connector.

4. The battery adaptor of claim 3, further comprising:
a first manual actuator disposed on the first battery pack interface member for coupling the third electrical connector to the first electrical connector; and
a second manual actuator disposed on the second battery pack interface member for coupling the third electrical connector to the second electrical connector.

5. The battery adaptor of claim 3, further comprising:
said power switching circuitry configured to automatically switch from one of the first and second external battery packs to the other one of the first and second external battery packs when a charge state of said one of the first and second external battery packs falls below a preselected threshold.

6. The battery adaptor of claim 3, wherein the electronic circuitry comprises one or more capacitors configured to store electrical energy and configured to act as one or both of:
a temporary power supply for preventing power interruption when the third electrical connector is switched from the first electrical connector to the second electrical connector or vice versa; and
a temporary power supply for preventing power interruption when one or both of the first and second external battery packs are removed and/or replaced with a like external battery pack.

7. The battery adaptor of claim 3, wherein each of said first and second battery pack interface members comprises:
a plurality of electrical contacts;
a plurality of electrical conductors configured to electrically couple the plurality of electrical contacts to the third electrical connector;

a hollow pivot pin pivotally coupling the respective first and second battery pack interface members to the respective first and second side of the housing; and
wherein the hollow pivot pin defines a passageway for the plurality of electrical conductors.

8. The battery adaptor of claim 7, wherein the hollow pivot pin includes an axial bore open at a distal end of the hollow pivot pin and a transverse aperture in communication with the axial bore disposed along a shaft of the hollow pivot pin.

9. The battery adaptor of claim 1, further comprising:
a distal end of the first external battery pack is configured to pivot away from an axial centerline of the housing when the first battery pack interface member is pivoted from the deployed position to the accessible position when the first external battery pack is attached to the first battery pack interface member; and
a distal end of the second external battery pack is configured to pivot away from the axial centerline of the housing when the second battery pack interface member is pivoted from the deployed position to the accessible position when the second external battery pack is attached to the second battery pack interface member.

10. The battery adaptor of claim 1, wherein each of the first and second battery pack interface members has an align-and-twist connector for detachably coupling the first and second external battery packs, respectively.

11. The battery adaptor of claim 1, wherein the first and second battery pack interface members are configured to attach to first and second external battery packs conforming to a Small Tactical Universal Battery (STUB) form factor.

12. The battery adaptor of claim 1, further comprising:
the first and second external battery packs configured to mutually obstruct each other to prevent detachment when the first and second external battery packs are attached to the respective first and second battery pack interface members and the first and second external battery packs are in the deployed position.

13. The battery adaptor of claim 1, further comprising a spring element biasing the first and second first battery pack interface members to the accessible position.

14. The battery adaptor of claim 13, further comprising:
a first latch member configured to releasably engage a complementary catch member disposed on the first battery pack interface member to secure the first battery pack interface member in the deployed position; and
a second latch member configured to engage a complementary catch member disposed on the second battery pack interface member to secure the second battery pack interface member in the deployed position.

15. The battery adaptor of claim 1, further comprising:
a locking plate configured to engage a distal end of the first external battery pack and a distal end of the second external battery pack and secure the first and second external battery packs in the respective deployed position.

16. The battery adaptor of claim 15, further comprising:
a tether cord securing the locking plate to the housing.

17. The battery adaptor of claim 15, further comprising:
one or more battery engagement features configured to retain the first and second external battery packs in the deployed position when the first and second external battery packs are attached to the respective first and second battery interface members.

18. The battery adaptor of claim 17, wherein the one or more engagement features include one or both of:

first and second upstanding tabs disposed on opposing transverse sides of the locking plate and configured to engage a surface of the first and second external battery packs, respectively, when the first and second external battery packs are attached to the respective first and second battery interface members and in the deployed position; and one or more upstanding lugs having a dual dovetail cross-sectional shape and configured to simultaneously engage a pair of dovetail channels disposed on the first and second external battery packs when the first and second external battery packs are attached to the respective first and second battery interface members and in the deployed position.

19. The battery adaptor of claim 1, in combination with the first and second external battery packs.

20. A method of mounting first and second external battery packs to a weapon, comprising:

attaching a battery adapter to an accessory rail associated with the weapon;

the battery adapter comprising:

a housing having a first side and a second side transversely spaced apart from the first side;

a first axially extending side wall disposed on the first side, a second axially extending side wall disposed on the second side, and an axially extending channel disposed intermediate the first and second side walls, the axially extending channel having a cross-sectional profile configured to physically and electrically mate with a portion of a weapon accessory mounting rail;

a first battery pack interface member hingedly coupled to the first side and a second battery pack interface member hingedly coupled to the second side, the first battery pack interface member configured to physically and electrically mate with the first external battery pack and the second external battery pack interface member configured to physically and electrically mate with the second external battery pack; and each of the first battery pack interface member and the second battery pack interface member being pivotal between a first functional orientation configured to rotate the first external battery pack and the second external battery pack, respectively, between a deployed position configured for normal operation of the first external battery pack and the second external battery pack, respectively, and an accessible position configured for attachment and detachment of the first external battery pack and the second external battery pack, respectively; and attaching the first external battery pack to the first battery pack interface member; and attaching the second external battery pack to the second battery pack interface member.

* * * * *